United States Patent
Sparks et al.

(10) Patent No.: US 11,485,858 B2
(45) Date of Patent: Nov. 1, 2022

(54) IMPACT-MODIFIED INJECTION-MOLDED POLYAMIDE

(71) Applicant: Ascend Performance Materials Operations LLC, Houston, TX (US)

(72) Inventors: Bradley J. Sparks, Pace, FL (US); Ryan M. Hensarling, Pace, FL (US); Kai Becker, Emmendingen (DE); Tariq Oweimreen, Sterling Heights, MI (US)

(73) Assignee: Ascend Performance Materials Operations LLC, Houston, TX (US)

( * ) Notice: Subject to any disclaimer, the term of this patent is extended or adjusted under 35 U.S.C. 154(b) by 0 days.

(21) Appl. No.: 16/778,420

(22) Filed: Jan. 31, 2020

(65) Prior Publication Data

US 2020/0247993 A1 Aug. 6, 2020

Related U.S. Application Data

(60) Provisional application No. 62/799,490, filed on Jan. 31, 2019.

(51) Int. Cl.
| | |
|---|---|
| *C08L 77/06* | (2006.01) |
| *C08K 5/09* | (2006.01) |
| *C08K 7/14* | (2006.01) |
| *C08K 5/3465* | (2006.01) |
| *C08L 51/06* | (2006.01) |

(52) U.S. Cl.
CPC ............... *C08L 77/06* (2013.01); *C08K 5/09* (2013.01); *C08K 5/3465* (2013.01); *C08K 7/14* (2013.01); *C08L 51/06* (2013.01); *C08L 2201/08* (2013.01); *C08L 2205/02* (2013.01); *C08L 2205/06* (2013.01); *C08L 2205/08* (2013.01)

(58) Field of Classification Search
CPC .................................. C08L 77/06; C08L 51/06
See application file for complete search history.

(56) References Cited

U.S. PATENT DOCUMENTS

| | | | | |
|---|---|---|---|---|
| 4,391,936 | A * | 7/1983 | Waggoner | C08K 3/04 524/89 |
| 2003/0162900 | A1 * | 8/2003 | Joachimi | C08L 77/00 525/178 |
| 2005/0074570 | A1 * | 4/2005 | Agrawal | B32B 27/08 428/36.91 |
| 2006/0175123 | A1 * | 8/2006 | Yabe | B62D 5/0409 180/444 |
| 2010/0130677 | A1 * | 5/2010 | Amici | C08L 77/06 524/606 |
| 2012/0001476 | A1 | 1/2012 | Yuan et al. | |

FOREIGN PATENT DOCUMENTS

| | | | | |
|---|---|---|---|---|
| EP | 2841504 | | 3/2015 | |
| WO | WO-2017062809 A1 * | | 4/2017 | ......... B29C 45/0005 |

OTHER PUBLICATIONS

Liu (Morphology and dynamic mechanical properties of long glass fiber-reinforced polyamide 6 composites. J Therm Anal Calorim, 216, 2016, 1281-1288).*
Hassan (Moisture Absorption Effect on Thermal, Dynamic Mechanical and Mechanical Properties of Injection-Molded Short Glass-Fiber/Polyamide 6,6 Composites. Fibers and Polymers, 13(7), 2012, pp. 899-906).*
Entec (Engage 8180, 2021, 2 pages).*
Pace (Pace N 54/1033, Colloids, 2009, 1 page).*
International Application No. PCT/US2020/016089, International Search Report and Written Opinion, dated May 13, 2020, 12 pages.

\* cited by examiner

*Primary Examiner* — Brieann R Johnston
(74) *Attorney, Agent, or Firm* — Cozen O'Connor

(57) ABSTRACT

An impact-modified polyamide composition comprising from 5 wt % to 85 wt % of polyamide polymer; from 10 wt % to 60 wt % glass fiber; from 3 wt % to 30 wt % of an impact modifier; and a melt stabilizer at a concentration less than 5 wt %; wherein the weight ratio of the impact modifier to the melt stabilizer ranges from 1.0:1 to 100:1; and wherein the polyamide composition demonstrates an unnotched Charpy impact energy loss at 23° C. that is greater than 80 kJ/m$^2$ and a tensile strength greater than 135 MPa.

14 Claims, No Drawings

IMPACT-MODIFIED INJECTION-MOLDED POLYAMIDE

CROSS REFERENCE TO RELATED APPLICATION

The present application claims priority to and filing benefit of U.S. Provisional Patent Application No. 62/799,490, filed on Jan. 31, 2019, which is incorporated herein by reference in its entirety.

FIELD

The present disclosure relates generally to polyamide compositions having improved impact resistance/absorption performance, which are particularly useful for injection molded applications.

BACKGROUND

Many varieties of natural and artificial polyamides have found use in various applications due to their high durability and strength. Some polyamide compositions can be formulated to have high melting points, high recrystallization temperatures, fast injection molding cycle times, high flow, toughness, elasticity, chemical resistance, inherent flame retardancy, and/or abrasion resistance. These desirable chemical and mechanical properties can make polyamide compositions suitable for use in constructing such diverse products as cable ties, sports equipment and sportswear, gun stocks, window thermal breaks, aerosol valves, food film packaging, automotive/vehicle parts, textiles, industrial fibers, carpeting, and electrical/electronic parts.

As one example, in the automotive industry there is an environmental need to reduce emissions and to increase the efficiency of fuel consumption. One approach towards achieving these goals is to reduce overall vehicle weight by substituting metal components with thermoplastic ones. And often times, polyamide compositions have been employed to provide such weight reduction in the engine compartment. Some of these polyamide compositions have also been found to be particularly well suited for automotive use due to their aforementioned heat resistance, mechanical strength, and overall appearance. Exemplary applications can include radiator tanks, charge air coolers, fans and shrouds, and push/pull cables.

In addition to the providing of mechanical strength, automotive applications also commonly require impact resistance, e.g., minimization of cabin noise, vibration, and harshness optionally via deformation. These performance characteristics, however, are often associated with conventional polyamide compositions, which have not been designed for imparting increased strength. In view of the existing art, the need therefore remains for improved polyamide compositions that effectively deliver both strength and impact resistance, e.g., toughness, as may be quantified by notched Izod and Charpy impact energy losses.

SUMMARY

In one embodiment, the disclosure is to an impact-modified polyamide composition including (from 5 wt % to 85 wt %) of one or more polyamide polymers, (10 wt % to 60 wt %) of glass fiber, (from 3 wt % to 30 wt %) of an impact modifier, e.g., a modified olefin, for example a maleic anhydride-modified olefin, acrylate, or acrylic, or combinations thereof, (less than 5 wt. %) of a melt stabilizer, e.g., a saturate fatty acid, for example stearic acid, and an optional (less than 5 wt. %) of heat stabilizer. The weight ratio of the impact modifier to the melt stabilizer may range from 1.0:1 to 100:1. The polyamide composition may demonstrate an un-notched Charpy impact energy loss at 23° C. that is greater than 80 kJ/m$^2$ and/or a tensile strength greater than 135 MPa. In certain embodiments, the one or more polyamide polymers includes a PA66 polymer and/or a PA6 polymer and/or has a number average molecular weight less than 100,000. In certain embodiments, the impact modifier includes an ethylene-octene copolymer. In certain aspects, the polyamide composition includes nigrosine at a concentration less than 5 wt %. In certain embodiments, the polyamide composition includes carbon black at a concentration less than 5 wt %. In some cases, the polyamide composition demonstrates a 60° tan delta greater than 0.04; and/or a 90° tan delta greater than 0.1. The impact modifier may have a glass transition temperature less than 0° C. In some cases, the weight ratio of the polyamide polymer to the glass fiber may range from 0.1 to 10; and/or the weight ratio of the polyamide polymer to the impact modifier may range from 0.2 to 30; and/or the weight ratio of the impact modifier to the melt stabilizer ranges from 1:1 to 40:1; and/or the weight ratio of the glass fiber to the impact modifier ranges from 0.3 to 20; and/or the weight ratio of the impact modifier to the heat stabilizer ranges from 0.5 to 300. In some embodiments, the polyolefin comprises from 13 wt % to 68 wt % PA66 polyamide polymer; from 25 wt % to 40 wt % glass fiber; impact modifier; from 1 wt % to 2 wt % nigrosine; from 0.1 wt % to 1 wt % heat stabilizer; less than 20 wt % PA6 polyamide polymer; less than 3 wt % carbon black; and less than 1 wt % melt stabilizer. In some cases, the impact modifier comprises a maleic anhydride-modified olefin, acrylate, or acrylic, or combinations thereof; and the weight ratio of the impact modifier to the melt stabilizer ranges from 5 to 50; and the melt stabilizer comprises a saturated fatty acid wherein the polyamide composition; and wherein the polyamide composition demonstrates a tensile elongation greater than 2.5%; and an un-notched Charpy impact energy loss at –40° C. that is greater than 65 kJ/m$^2$. In some cases, the polyamide composition comprises from 13 wt % to 68 wt % of a PA66 polyamide polymer; from 25 wt % to 40 wt % glass fiber; and the polyamide composition has a notched Charpy impact energy loss at 23° C. greater than 11 kJ/m$^2$.

In another embodiment the disclosure relates to a method of preparing a polyamide composition. The method includes providing one or more polyamide polymers, glass fiber, an impact modifier, and an optional heat stabilizer. The method further includes combining the one or more polyamide polymers, the glass fiber, the impact modifier, and the heat stabilizer to produce the polyamide composition. In certain aspects, the method further includes providing nigrosine, and adding the nigrosine to the polyamide composition. In certain embodiments, the method further includes providing carbon black, and adding the carbon black to the polyamide composition. In some aspects, the method further includes providing a melt stabilizer, and adding the melt stabilizer to the polyamide composition.

In another embodiment, the disclosure is to an injection molded article. The article includes any of the provided polyamide compositions.

DETAILED DESCRIPTION

The present disclosure generally relates to polyamide compositions that, when employed for example in injection molded applications, provide advantageous improvements in both strength and impact resistance, e.g., toughness. For example, it is beneficial for molded thermoplastic parts to have a high degree of rigidity and stiffness, allowing them to provide sufficient strength in applications calling for lightweight constructions materials that can be substituted for metals. It is also beneficial for molded plastics to have adequate impact resistance to enable the material to minimize unwanted vibrations and better absorb impact forces.

It has proven difficult, however, for conventional polyamide resins and compositions to simultaneous meet each of these demands. One reason for this is that conventional modifications made to polyamide compositions with the goal of increasing strength function in part by reducing, rather than increasing, the plasticity of the material. Typical polyamide preparations intended for construction applications include a reinforcing filler such as glass fiber to supply additional strength. Such conventional reinforced polyamides are also characterized, however, by reduced mechanical properties, such as elongation and impact strength, that are desired for automotive and other applications.

The inventors have now discovered that the use of particular reinforced and impact-modified polyamide compositions surprisingly provide for materials that demonstrate both increased overall strength, e.g., tensile/flexural properties, and improved impact resistance, e.g., ductility and impact strength. Moreover, in some aspects, the ductility and impact resistance of the material can synergistically improve together with the overall strength. In particular, the inventors have found that certain types, amounts, and ratios of polyamide polymers, glass fiber, impact modifiers, melt stabilizers (lubricants), and optional heat stabilizers can be combined to produce the compositions having surprising mechanical and impact properties. Without being bound by theory, it is believed that the specific impact modifiers, e.g., those having specific glass transition temperatures, work with the other components to synergistically dissipate energy.

In some cases, the use of specific impact modifiers and melt stabilizers, optionally employed at particular weight ratios, provides for the aforementioned synergistic improvement in tensile strength and impact resilience. Generally, impact modifiers are known to have detrimental effects on tensile strength. However, when the disclosed impact modifiers and melt stabilizers are used together, an unexpected balance is struck, and little or no loss in tensile performance is observed, while surprisingly impact resilience is significantly improved.

Notably, the importance of the component ratios (such as those disclosed herein) in simultaneously enabling advantageous strength and ductility characteristics had not been previously appreciated. The improved ductility of the material is reflected in, for example, an increase in the material modulus and the elongation of the material before break.

In one aspect, an impact-modified polyamide composition is disclosed. The composition includes one or more polyamide polymers, glass fiber, an impact modifier, and an optional heat stabilizer. As described in greater detail below, the composition preferably includes from 5 wt % to 85 wt % of the polyamide polymers, from 10 wt % to 60 wt % glass fiber, from 3 wt % to 30 wt % of one or more impact modifiers, and/or less than 5 wt % of one or more heat stabilizers. By employing these components in the composition (at the concentrations and ratios disclosed herein), a polyamide composition that demonstrates improved (tensile) strength and impact resistance characteristics is provided, for example, a polyamide composition demonstrating a flexural modulus greater than 2500 MPa and/or a tensile strength greater than 135 MPa, and/or a notched Izod impact energy loss at 23° C. greater than 5 kJ/m$^2$, or an un-notched Charpy impact energy loss greater than 80 kJ/m$^2$. The polyamide compositions disclosed herein can also have other advantageous mechanical properties including a high elongation at break, flexural strength at break, tensile strength at break, and tensile modulus.

The components of the polyamide composition are now discussed individually. It is contemplated that these components will be employed with one another to form the aforementioned polyamide compositions.

Polyamide Polymers

The polyamide of the disclosed compositions can vary widely and can include one polyamide polymer or two or more polyamides. Exemplary polyamides and polyamide compositions are described in Kirk-Othmer, Encyclopedia of Chemical Technology, Vol. 18, pp. 328-371 (Wiley 1982), the disclosure of which is incorporated by reference. Briefly, polyamides are products that contain recurring amide groups as integral parts of the main polymer chains. Linear polyamides are of particular interest and may be formed from condensation of bifunctional monomers as is well known in the art. Polyamides are frequently referred to as nylons. Particular polyamide polymers and copolymers and their preparation are described in, for example, U.S. Pat. Nos. 2,071,250; 2,071,251; 2,130,523; 2,130,948; 2,241,322; 2,312,966; 2,512,606; 3,236,914; 3,472,916; 3,373,223; 3,393,210; 3,984,497; 3,546,319; 4,031,164; 4,320,213; 4,346,200; 4,713,415; 4,760,129; 4,981,906; 5,504,185; 5,543,495; 5,698,658; 6,011,134; 6,136,947; 6,169,162; 6,197,855; 7,138,482; 7,381,788; and 8,759,475, each of which is incorporated by reference in entirety for all purposes.

The one or more polyamide polymers of the composition can include aliphatic polyamides such as polymeric E-caprolactam (PA6) and polyhexamethylene adipamide (PA66) or other aliphatic nylons, polyamides with aromatic components such as paraphenylenediamine and terephthalic acid, and copolymers such as adipate with 2-methyl pentmethylene diamine and 3,5-diacarboxybenzenesulfonic acid or sulfoisophthalic acid in the form of its sodium sultanate salt. The polyamides can include polyaminoundecanoic acid and polymers of bis-paraaminocyclohexyl methane and undecanoic acid. Other polyamides include poly(aminododecanoamide), polyhexamethylene sebacamide, poly(p-xylyleneazeleamide), poly(m-xylylene adipamide), and polyamides from bis(p-aminocyclohexyl)methane and azelaic, sebacic and homologous aliphatic dicarboxylic acids. As used herein, the terms "PA6 polymer" and "PA6 polyamide polymer" also include copolymers in which PA6 is the major component. As used herein the terms "PA66 polymer" and "PA66 polyamide polymer" also include copolymers in which PA66 is the major component. In some embodiments, copolymers such as PA-6,6/6I; PA-6I/6T; or PA-6,6/6T, or combinations thereof are contemplated for use as the polyamide polymer. In some cases, physical blends, e.g., melt blends, of these polymers are contemplated. In one embodiment, the polyamide polymer comprises PA-6, or PA-6,6, or a combination thereof.

The polyamide compositions can include polyamides produced through the ring-opening polymerization or polycondensation, including the copolymerization and/or copolycondensation, of lactams. These polyamides can include, for example, those produced from propriolactam, butyrolactam, valerolactam, and caprolactam. For example, in some embodiments, the composition includes a polyamide polymer derived from the polymerization of caprolactam.

Common polyamides include nylons and aramids. For example, the composition can include PA6 (also referred to as polyamide 6 or nylon 6), PA66 (also referred to as polyamide 66, polyamide 6,6, or nylon 6,6), or combinations thereof. The composition can include one or more additional nylons such as PA-4T/4I, PA-4T/6I, PA-5T/5I, PA-6,6/6, PA-6,6/6T, PA-6T/6I, PA-6T/6I/6, PA-6T/6, PA-6T/6I/66, PA-6T/MPDMT (where MPDMT is a polyamide based on a mixture of hexamethylene diamine and 2-methylpentamethylene diamine as the diamine component and terephthalic acid as the diacid component), PA-6T/66, PA-6T/610, PA-10T/612, PA-10T/106, PA-6T/612, PA-6T/10T, PA-6T/10I, PA-9T, PA-10T, PA-12T, PA-10T/10I, PA-10T/12, PA-10T/11, PA-6T/9T, PA-6T/12T, PA-6T/10T/6I, PA-6T/6I/6, PA-6T/6I/12, and combinations thereof.

The concentration of the one or more polyamide polymers in the polyamide composition can, for example, range from 5 wt % to 85 wt %, e.g., from 5 wt % to 53 w %, from 13 wt % to 61 wt %, from 21 wt % to 69 wt %, from 29 wt % to 77 wt %, from 37 wt % to 85 wt %, from 40 wt % to 65 wt %, from 45 wt % to 60 wt %, from 50 wt % to 60 wt %, or from 51 wt % to 57 wt %. In some embodiments, the concentration of the one or more polyamide polymers ranges from 13 wt % to 68 wt %. In certain aspects, the concentration of the one or more polyamide polymers ranges from 30 wt % to 60 wt %. In terms of upper limits, the combined polyamide polymer concentration can be less than 85 wt %, e.g., less than 77 wt %, less than 69 wt %. less than 61 wt %, less than 60 wt %, less than 57 wt %, less than 53 wt %, less than 45 wt %, less than 65 wt %, less than 37 wt %, less than 29 wt %, less than 21 wt %, or less than 13 wt %. In terms of lower limits, the combined polyamide polymer concentration can be greater than 5 wt %, e.g., greater than 13 wt %, greater than 21 wt %, greater than 29 wt %, greater than 37 wt %, greater than 40 wt %, greater than 45 wt %, greater than 50 wt %, greater than 51 wt %, greater than 61 wt %, greater than 69 wt %, or greater than 77 wt %. Lower concentrations, e.g., less than 5 wt %, and higher concentrations, e.g., greater than 85 wt %, are also contemplated. In some cases, the ranges and limits disclosed for the one or more polyamide polymers are applicable to the PA66.

In certain aspects, the one or more polyamide polymers includes a PA66 polymer. PA66 has a rapid crystallization rate and high temperature performance versus other engineering resins such as polyethylene terephthalate (PET), conveying significant advantages for use in injection molding. The concentration of the PA66 polymer in the one or more polyamide polymers can, for example, range from 0 wt % to 100 wt %, e.g., from 0 wt % to 60 wt %, from 10 wt % to 70 wt %, from 20 wt % to 80 wt %, from 30 wt % to 90 wt %, or from 40 wt % to 100 wt %. In some embodiments, the one or more polyamide polymers includes from 25 wt % to 100 wt % PA66 polymer. In terms of upper limits, the PA66 polymer concentration in the one or more polyamide polymers can be less than 100 wt %, e.g., less than 90 wt %, less than 80 wt %, less than 70 wt %, less than 60 wt %, less than 50 wt %, less than 40 wt %, less than 30 wt %, less than 20 wt %, or less than 10 wt %. In terms of lower limits, the PA66 polymer concentration in the one or more polyamide polymers can be greater than 0 wt %, e.g., greater than 10 wt %, greater than 20 wt %, greater than 30 wt %, greater than 40 wt %, greater than 50 wt %, greater than 60 wt %, greater than 70 wt %, greater than 80 wt %, or greater than 90 wt %.

The concentration of PA66 polymer in the overall polyamide composition can, for example, range from 13 wt % to 68 wt %, e.g., from 13 wt % to 46 wt %, from 18.5 wt % to 51.5 wt %, from 24 wt % to 57 wt %, from 29.5 wt % to 62.5 wt %, or from 35 wt % to 68 wt %. In terms of upper limits, the PA66 polymer concentration in the overall polyamide composition can be less than 68 wt %, e.g., less than 62.5 wt %, less than 57 wt %, less than 51.5 wt %, less than 46 wt %, less than 40.5 wt %, less than 35 wt %, less than 29.5 wt %, less than 24 wt %, or less than 18.5 wt %. In terms of lower limits, the PA66 polymer concentration in the overall polyamide composition can be greater than 13 wt %, e.g., greater than 18.5 wt %, greater than 24 wt %, greater than 29.5 wt %, greater than 35 wt %, greater than 40.5 wt %, greater than 46 wt %, greater than 51.5 wt %, greater than 57 wt %, or greater than 62.5 wt %. Higher concentrations, e.g., greater than 68 wt %, and lower concentrations, e.g., less than 13 wt %, are also contemplated.

In certain aspects, the one or more polyamide polymers includes a PA6 polymer. The concentration of the PA6 polymer in the one or more polyamide polymers can, for example, range from 0 wt % to 100 wt %, e.g., from 0 wt % to 60 wt %, from 10 wt % to 70 wt %, from 20 wt % to 80 wt %, from 30 wt % to 90 wt %, or from 40 wt % to 100 wt %. In some embodiments, the one or more polyamide polymers includes from 0 wt % to 75 wt % PA6 polymer. In terms of upper limits, the PA6 polymer concentration in the one or more polyamide polymers can be less than 100 wt %, e.g., less than 90 wt %, less than 80 wt %, less than 70 wt %, less than 60 wt %, less than 50 wt %, less than 40 wt %, less than 30 wt %, less than 20 wt %, or less than 10 wt %. In terms of lower limits, the PA6 polymer concentration in the one or more polyamide polymers can be greater than 0 wt %, e.g., greater than 10 wt %, greater than 20 wt %, greater than 30 wt %, greater than 40 wt %, greater than 50 wt %, greater than 60 wt %, greater than 70 wt %, greater than 80 wt %, or greater than 90 wt %.

The concentration of PA6 polymer in the overall polyamide composition can, for example, range from 0 wt % to 20 wt %, e.g., from 0 wt % to 12 wt %, from 2 wt % to 14 wt %, from 4 wt % to 16 wt %, from 6 wt % to 18 wt %, or from 8 wt % to 20 wt %. In terms of upper limits, the PA6 concentration in the overall polyamide composition can be less than 20 wt %, e.g., less than 18 wt %, less than 16 wt %, less than 14 wt %, less than 12 wt %, less than 10 wt %, less than 8 wt %, less than 6 wt %, less than 4 wt %, or less than 2 wt %. In terms of lower limits, the PA6 concentration in the overall polyamide composition can be greater than 0 wt %, e.g., greater than 2 wt %, greater than 4 wt %, greater than 6 wt %, greater than 8 wt %, greater than 10 wt %, greater than 12 wt %, greater than 14 wt %, greater than 16 wt %, or greater than 18 wt %. Higher concentrations, e.g., greater than 20 wt %, are also contemplated.

The polyamide composition can include a combination of polyamides. By combining various polyamides, the final composition can incorporate the desirable properties, e.g., mechanical properties, of each constituent polyamides. The combination of polyamides could include any number of known polyamides. In some embodiments, the polyamide composition includes a combination of PA6 and PA66, preferably present in the amounts discussed herein. In certain aspects, the polyamide composition includes from 13 wt % to 68 wt % PA66 polyamide polymer and less than 20 wt % PA6 polyamide polymer. The polyamide composition can also include combinations of any of the PA6 and PA66 percentages described herein.

In some embodiments, one or more low melt temperature polyamides are utilized, e.g., a polyamide having a melt temperature below 210° C., e.g., below 206° C., below 202° C., below 198° C., below 194° C., below 190° C., below 186° C., below 182° C., below 178° C., or below 174° C. The melt temperature of the one or more polyamides can each independently, for example, range from 170° C. to 210° C., e.g., from 170° C. to 194° C., from 174° C. to 198° C., from 178° C. to 202° C., from 182° C. to 206° C., or from 186° C. to 210° C. In terms of lower limits, the melt temperature of each of the polyamides can be greater than 170° C., e.g., greater than 174° C., greater than 178° C., greater than 182° C., greater than 186° C., greater than 190° C., greater than 194° C., greater than 198° C., greater than 202° C., or greater than 206° C. Higher melt temperatures, e.g., greater than 210° C., and lower melt temperatures, e.g., less than 170° C., are also contemplated. In some embodiments, one or more amorphous polyamides are utilized, e.g., polyamides that do not have defined melting points.

The one or more polyamides each independently have a specific configuration of end groups, such as, for example, amine end groups, carboxylate end groups and so-called inert end groups including mono-carboxylic acids, mono amines, lower dicarboxylic acids capable of forming inert imine end groups, phthalic acids and derivatives thereof. It has been found that in some aspects, the polymer end groups can be selected to specifically interact with the impact modifier of the composition, affecting dispersion and resulting mechanical properties.

In addition to the compositional make-up of the polyamide mixture, it has also been discovered that the relative viscosities of the one or more amide polymers can provide surprising benefits, both in performance and processing. For example, if the relative viscosity of the amide polymer is within certain ranges and/or limits, production rates and tensile strength (and optionally impact resilience) are improved. As described herein, "relative viscosity" or "RV" refers to a comparison of the viscosity of a solution of polymer in formic acid with the viscosity of the formic acid itself, and is measured using 90% formic acid and glass capillary Ubbelohde viscometers according to the standard protocol ASTM D789-18 (2018). For samples containing fiberglass or other fillers, the weight of sample to be dissolved is adjusted according to the amount of filler to provide the required 11.0 grams of neat resin per 100 ml formic acid. Solutions containing such fillers are filtered before loading into the viscometer.

The relative viscosity of the one or more polyamides can each independently or collectively, for example, range from 25 to 250, e.g., from 25 to 160, from 47.5 to 182.5, from 70 to 205, from 92.5 to 227.5, or from 115 to 250. The relative viscosity of the one or more polyamides can each independently or collective range from 25 to 65, e.g., from 25 to 49, from 29 to 53, from 33 to 57, from 37 to 61, or from 41 to 65. In terms of upper limits, the polyamide relative viscosity can be less than 250, e.g., less than 227.5, less than 205, less than 182.5, less than 160, less than 137.5, less than 115, less than 92.5, less than 70, less than 65, less than 61, less than 57, less than 53, less than 49, less than 45, less than 41, less than 37, less than 33, or less than 29. In terms of lower limits, the polyamide relative viscosity can be greater than 25, e.g., greater than 29, greater than 33, greater than 37, greater than 41, greater than 45, greater than 49, greater than 53, greater than 57, greater than 61, greater than 65, greater than 70, greater than 92.5, greater than 115, greater than 137.5, greater than 160, greater than 182.5, greater than 205, greater than 227.5. Higher relative viscosities, e.g., greater than 250, and lower relative viscosities, e.g., less than 25, are also contemplated.

The number average molecular weight of the one or more polyamide polymers in the polyamide composition can each independently, for example, range from 10,000 Daltons to 100,000 Daltons, e.g., from 10,000 Daltons to 64,000 Daltons, from 19,000 Daltons to 73,000 Daltons, from 28,000 Daltons to 82,000 Daltons, from 37,000 Daltons to 91,000 Daltons, or from 46,000 Daltons to 100,000 Daltons. The number average molecular weight of the polyamide polymers can each independently or collectively rage from 10,000 Daltons to 26,000 Daltons, e.g., from 10,000 Daltons to 19,600 Daltons, from 11,600 Daltons to 21,200 Daltons, from 13,200 Daltons to 22,800 Daltons, from 14,800 Daltons to 24,400 Daltons, or from 16,400 Daltons to 26,000 Daltons. In terms of upper limits, the molecular weight of each of the polyamide polymers can independently be less than 100,000 Daltons, e.g., less than 91,000 Daltons, less than 82,000 Daltons, less than 73,000 Daltons, less than 64,000 Daltons, less than 55,000 Daltons, less than 46,000 Daltons, less than 37,000 Daltons, less than 28,000 Daltons, less than 26,000 Daltons, less than 24,400 Daltons, less than 22,800 Daltons, less than 21,200 Daltons, less than 19,600 Daltons, less than 18,000 Daltons, less than 16,400 Daltons, less than 14,800 Daltons, less than 13,200 Daltons, or less than 11,600 Daltons. In terms of lower limits, the molecular weight of each of the polyamide polymers can independently be greater than 10,000 Daltons, e.g., greater than 11,600 Daltons, greater than 13,200 Daltons, greater than 14,800 Daltons, greater than 16,400 Daltons, greater than 18,000 Daltons, greater than 19,600 Daltons, greater than 21,200 Daltons, greater than 22,800 Daltons, greater than 24,400 Daltons, greater than 26,000 Daltons, greater than 28,000 Daltons, greater than 37,000 Daltons, greater than 46,000 Daltons, greater than 55,000 Daltons, greater than 64,000 Daltons, greater than 73,000 Daltons, greater than 82,000 Daltons, or greater than 91,000 Daltons. Higher molecular weights, e.g., greater than 100,000 Daltons, and smaller molecular weights, e.g., less than 10,000 Daltons, are also contemplated.

In some embodiments, each of the one or more polyamide polymers is crystalline or semi-crystalline. In some embodiments, each of the one or more polyamide polymers is crystalline. In some embodiments, each of the one or more polyamide polymers is semi-crystalline.

Glass Fiber

The polyamide composition includes a reinforcing filler, e.g., glass fiber. The glass fiber can include soda lime silicate, zirconium silicates, calcium borosilicates, alumina-calcium borosilicates, calcium aluminosilicates, magnesium aluminosilicates, or combinations thereof. The glass fiber can include long fibers, e.g., greater than 6 mm, short fibers, e.g., less than 6 mm, or combinations thereof. The glass fiber can be milled.

The amount of glass fiber in the polyamide composition relative to the amounts of the other composition components can be selected to advantageously provide additional strength without negatively affecting material ductility. The concentration of glass fiber in the polyamide composition can, for example, range from 10 wt % to 60 wt %, e.g., from 10 wt % to 40 wt %, from 15 wt % to 45 wt %, from 20 wt % to 50 wt %, from 25 wt % to 55 wt %, or from 30 wt % to 60 wt %. In some embodiments, the concentration of glass fiber ranges from 25 wt % to 40 wt % e.g., from 25 wt % to 34 wt %, from 26.5 wt % to 35.5 wt %, from 28 wt % to 37 wt %, from 29.5 wt % to 38.5 wt %, or from 31 wt % to 40 wt %. In certain aspects, the concentration of glass fiber ranges from 30 wt % to 35 wt %. In terms of upper limits, the glass fiber concentration can be less than 60 wt %, e.g., less than 55 wt %, less than 50 wt %, less than 45 wt %, less than 40 wt %, less than 38.5 wt %, less than 37 wt %, less than 35.5 wt %, less than 34 wt %, less than 32.5 wt %, less than 31 wt %, less than 29.5 wt %, less than 28 wt %, less than 26.5 wt %, less than 25 wt %, less than 20 wt %, or less than 15 wt %. In terms of lower limits, the glass fiber concentration can be greater than 10 wt %, e.g., greater than 15 wt %, greater than 20 wt %, greater than 25 wt %, greater than 26.5 wt %, greater than 28 wt %, greater than 29.5 wt %, greater than 31 wt %, greater than 32.5 wt %, greater than 34 wt %, greater than 35.5 wt %, greater than 37 wt %, greater than 38.5 wt %, greater than 40 wt %, greater than 45 wt %, greater than 50 wt %, or greater than 55 wt %. Lower concentrations, e.g., less than 10 wt %, and higher concentrations, e.g., greater than 60 wt %, are also contemplated.

The weight ratio of the one or more polyamide polymers to glass fiber in the polyamide composition can, for example, range from 0.1 to 10, e.g., from 0.1 to 1.6, from 0.16 to 2.5, from 0.25 to 4, from 0.4 to 6.3, or from 0.63 to 10. In terms of upper limits, the weight ratio of the one or more polyamide polymers to glass fiber can be less than 10, e.g., less than 6.3, less than 4, less than 2.5, less than 1.6, less than 1, less than 0.63, less than 0.4, less than 0.25, or less than 0.16. In terms of lower limits, the weight ratio of the one or more polyamide polymers to glass fiber can be greater than 0.1, e.g., greater than 0.16, greater than 0.25, greater than 0.4, greater than 0.63, greater than 1, greater than 1.6, greater than 2.5, greater than 4, or greater than 6.3. Lower ratios, e.g., less than 0.1, and higher ratios, e.g., greater than 10, are also contemplated.

Impact Modifier

The polyamide compositions disclosed herein include one or more impact modifiers. The inventors have found that these impact modifiers beneficially can be an elastomeric or rubbery material selected to have good interaction and compatibility with, and dispersion among, the one or more polyamide polymers of the composition. The impact modifier can include a styrenic copolymer such as an acrylate-butadiene-styrene or a methyl methacrylate-butadiene-styrene. The impact modifier can include an acrylic polymer or a polyethylene polymer such as a chlorinated polyethylene. In some embodiments, the impact modifier includes an ethylene-octene copolymer. In some cases, the combination of the impact modifier and the melt stabilizers (optionally in the disclosed amounts and ratios) provides for surprising, synergistic combinations of performance features, e.g., tensile/flexural performance and impact resistance.

In some cases, the impact modifier comprises olefins, acrylates, or acrylics, or combinations thereof, including polymers of these compounds such as polyolefins or polyacrylates. These compounds may be modified, e.g., modified (grafted) with maleic anhydride. In some embodiments, the impact modifier comprises a maleic anhydride-modified olefin, acrylate, or acrylic, or combinations thereof. In some cases, the impact modifier comprises a modified olefin, e.g., a maleic anhydride-modified olefin. The impact modifier may comprise a maleic anhydride-modified ethylene octene and/or ethylene acrylate.

In some embodiments, the impact modifier has a glass transition temperature ranging from ranging from 0° C. to −100° C., e.g., from −5° C. to −80° C., −10° C. to −70° C., −20° C. to −60° C., or from −25° C. to −55° C. In terms of lower limits, the impact modifier may have a glass transition temperature greater than −100° C., e.g., greater than −80° C., greater than −70° C., greater than −60° C., or greater than −55° C. In terms of upper limits, the impact modifier may have a glass transition temperature less than 0° C., e.g., less than −5° C., less than −10° C., less than −15° C., or less than −25° C. It is believed that impact modifiers having such glass transition temperatures synergistically improve energy dissipation characteristics, e.g., impact resistance. These particular impact modifiers have glass transition temperatures in temperature ranges that work with the disclosed polyamides and glass fibers to achieve improved impact performance, especially in the desired temperature ranges, e.g., −10° C. to −70° C.

The concentration of the impact modifier in the polyamide composition can, for example, range from 3 wt % to 30 wt %, e.g., from 3 wt % to 19.2 wt %, from 2 wt % to 25 wt %, from 2 wt % to 20 wt %, from 5.7 wt % to 21.9 wt %, from 4.0 wt % to 15 wt %, from 5.5 wt % to 14 wt %, from 6.0 wt % to 11.5 wt %, from 8.4 wt % to 24.6 wt %, from 11.1 wt % to 27.3 wt %, or from 13.8 wt % to 30 wt %. In some embodiments, the concentration of the impact modifier ranges from 6 wt % to 20 wt %, e.g., from 6 wt % to 14.4 wt %, from 7.4 wt % to 15.8 wt %, from 8.8 wt % to 17.2 wt %, from 10.2 wt % to 18.6 wt %, or from 11.6 wt % to 20 wt %. In terms of upper limits, the impact modifier concentration can be less than 30 wt %, e.g., less than 27.3 wt %, less than 24.6 wt %, less than 21.9 wt %, less than 20 wt %, less than 18.6 wt %, less than 17.2 wt %, less than 15.8 wt %, less than 15 wt %, less than 14 wt %, less than 14.4 wt %, less than 13 wt %, less than 11.6 wt %, less than 11.5 wt %, less than 10.2 wt %, less than 8.8 wt %, less than 7.4 wt %, less than 6 wt %, or less than 5.4 wt %. In terms of lower limits, the impact modifier concentration can be greater than 3 wt %, greater than 4.0 wt %, greater than 5.5 wt %, greater than 5.4 wt %, greater than 6 wt %, greater than 7.4 wt %, greater than 8.8 wt %, greater than 10.2 wt %, greater than 11.6 wt %, greater than 13 wt %, greater than 14.4 wt %, greater than 15.8 wt %, greater than 17.2 wt %, greater than 18.6 wt %, greater than 20 wt %, greater than 21.9 wt %, greater than 24.6 wt %, or greater than 27.6 wt %. Lower concentrations, e.g., less than 3 wt %, and higher concentrations, e.g., greater than 30 wt %, are also contemplated.

The ratio of the amounts of the impact modifier and the glass fiber in the composition have unexpectedly been found to be particularly important in producing materials having advantageous combinations of strength and ductility properties. The weight ratio of glass fiber to the impact modifier in the polyamide composition can, for example range from 0.3 to 20, e.g., from 0.3 to 15, from 1 to 12, from 2 to 10, from 2.5 to 7.5, from 0.46 to 5.7, from 0.69 to 8.6, from 1.1 to 13, or from 1.6 to 20. In terms of upper limits, the weight ratio of glass fiber to the impact modifier can be less than 20, e.g., less than 15, less than 13, less than 12, less than 8.6, less than 7.5, less than 5.7, less than 3.7, less than 2.4, less than 1.6, less than 1.1, or less than 0.69. In terms of lower limits, the weight ratio of glass fiber to the impact modifier can be greater than 0.3, e.g., greater than 0.46, greater than 0.69, greater than 1, greater than 1.1, greater than 1.6, greater than 2, greater than 2.4, greater than 5.7, greater than 8.6, or greater than 13. Lower ratios, e.g., less than 0.3, and higher ratios, e.g., greater than 20, are also contemplated.

The weight ratio of the one or more polyamide polymers to the impact modifier in the polyamide composition can, for example, range from 0.2 to 30, e.g., from 0.2 to 4, from 0.33 to 6.7, from 2 to 7, from 3 to 6, 1 to 15, from 5 to 15, from 2 to 12, from 0.54 to 11, from 0.9 to 18, or from 1.5 to 30.

In terms of upper limits, the weight ratio of the one or more polyamide polymers to the impact modifier can be less than 30, e.g., less than 18, less than 15, less than 12, less than 11, less than 7, less than 6, less than 6.7, less than 4, less than 2.4, less than 1.5, less than 0.9, less than 0.54, or less than 0.33. In terms of lower limits, the weight ratio of the one or more polyamide polymers to the impact modifier can be greater than 0.2, e.g., greater than 0.33, greater than 0.55, greater than 0.9, greater than 1.5, greater than 2, greater than 2.4, greater than 3, greater than 5, greater than 6.7, greater than 11, or greater than 18. Lower ratios, e.g., less than 0.2, and higher ratios, e.g., greater than 30, are also contemplated.

Heat Stabilizer

The one or more heat stabilizers of the polyamide composition can be selected to improve performance, e.g., at higher operating temperatures, of the composition without significantly negatively affecting the strength or ductility of the material. The heat stabilizer can include, for example, hindered phenolic stabilizers, phosphite-based stabilizers, hindered amine-based stabilizers, triazine-based stabilizers, sulfur-based stabilizers, copper stabilizers, or combinations thereof.

Examples of hindered phenolic stabilizers include N,N'-hexane-1,6-diylbis[3-(3,5-ditert-butyl-4-hydroxyphenylpropionamide)]; pentaerythrityl-tetrakis[3-(3,5-di-tert-butyl-4-hydroxyphenyl)propionate]; N,N'-hexamethylene bis(3,5-di-tert-butyl-4-hydroxyhydrocinnamamide); triethyleneglycol-bis[3-(3-tert-butyl-5-methyl-4-hydroxyphenyl) propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzyl phos phonate-diethyl ester; 1,3,5-trimethyl-2,4,6-tris(3,5-ditert-butyl-4-hydroxybenzyl)benzene; and 1,3,5-tris(4-tert-butyl-3-hydroxy-2,6-dimethylbenzyl)isocyanurate.

Examples of phosphite-based stabilizers include trioctyl phosphite; trilauryl phosphite; tridecyl phosphite; octyldiphenyl phosphite; trisisodecyl phosphite; phenyl diisodecyl phosphite; phenyl di(tridecyl)phosphite; diphenyl isooctyl phosphite; diphenyl isodecyl phosphite; diphenyl(tridecyl) phosphite; triphenyl phosphite; tris(nonyl phenyl) phosphite; tris(2,4-di-tert-butyl phenyl) phosphite; tris(2,4-di-tert-butyl-5-methylphenyl)phosphite; tris(butoxyethyl) phosphite; 4,4'-butylidene-bis(3-methyl-6-tertbutylphenyl-tetra-tridecyl)diphosphite; tetra($C_{12}$- to $C_{15}$-mixed alkyl)-4,4'-isopropylidenediphenyl diphosphite; 4,4'-isopropylidenebis(2-tert-butylphenyl)-di(nonylphenyl) phosphite; tris(biphenyl)phosphite; tetra(tridecyl)-1,1,3-tris(2-methyl-5-tertbutyl-4-hydroxyphenyl)butane diphosphite; tetra(tridecyl)-4,4'-butylidenebis(3-methyl-6-tert-butylphenyl)diphosphite; tetra($C_1$- to $C_{15}$-mixed alkyl)-4,4'-isopropylidenediphenyl diphosphite; tris(mono-/di-mixed nonylphenyl)phosphite; 4,4'-isopropylidenebis(2-tertbutylphenyl)-di(nonylphenyl)phosphite; 9,10-di-hydro-9-oxa-10-phosphorphenanthrene-10-oxide; tris(3,5-di-t-butyl-4-hydroxyphenyl)phosphite; hydrogenated-4,4'-isopropylidenediphenyl polyphosphite; bis(octylphenyl)-bis(4,4'-butylidenebis(3-methyl-6-tert-butyl phenyl)-1,6-hexanol diphosphite; hexa(tridecyl)-1,1,3-tris(2-methyl-4-hydroxy-5-tert-butylphenyl)butane triphosphite; tris(4,4'-isopropylidenebis(2-tertbutylphenyl)phosphite; tris(1,3-stearoyloxyisopropyl)phosphite; 2,2-methylenebis(4,6-ditert-butylphenyl)octyl phosphite; 2,2-methylenebis(3-methyl-4,6-di-tert-butylphenyl)-2-ethylhexyl phosphite; tetrakis(2,4-di-tert-butyl-5-methylphenyl)-4,4'-biphenylene diphosphite; and tetrakis(2,4-di-tert-butyl phenyl)-4,4'-biphenylene diphosphite.

Phosphite-based stabilizers also include pentaerythritol-type phosphite compounds, such as 2,6-di-tert-butyl-4-methylphenyl-phenyl-pentaerythritol diphosphite; 2,6-di-tert-butyl-4-methylphenyl-methyl-pentaerythritol diphosphite; 2,6-di-tert-butyl-4-methylphenyl-2-ethylhexyl-pentaerythritol diphosphite; 2,6-di-tert-butyl-4-methylphenylisodecyl-pentaerythritol diphosphite; 2,6-di-tert-butyl-4-methylphenyl-laurylpentaerythritol diphosphite; 2,6-di-tert-butyl-4-methylphenyl-isotridecyl-pentaerythritol diphosphite; 2,6-di-tert-butyl-4-methylphenyl-stearyl-pentaerythritol diphosphite; 2,6-ditert-butyl-4-methylphenyl-cyclohexyl-pentaerythritol diphosphite; 2,6-di-tert-butyl-4-methylphenyl-benzyl-pentaerythritol diphosphite; 2,6-di-tert-butyl-4-methylphenyl-ethylcellosolve-pentaerythritol diphosphite; 2,6-di-tert-butyl-4-methylphenyl-butylcarbitol-pentaerythritol diphosphite; 2,6-di-tert-butyl-4-methylphenyl-octylphenyl-pentaerythritol diphosphite; 2,6-di-tert-butyl-4-methylphenyl-nonylphenyl-pentaerythritol diphosphite; bis(2,6-di-tert-butyl-4-methylphenyl)pentaerythritol diphosphite; bis(2,6-di-tert-butyl-4-ethylphenyl) pentaerythritol diphosphite; 2,6-di-tert-butyl-4-methylphenyl-2,6-di-tertbutylphenyl-pentaerythritol diphosphite; 2,6-di-tert-butyl-4-methylphenyl-2,4-di-tertbutylphenyl-pentaerythritol diphosphite; 2,6-di-tert-butyl-4-methylphenyl-2,4-di-tertoctylphenyl-pentaerythritol diphosphite; 2,6-di-tert-butyl-4-methylphenyl-2-cyclohexylphenyl-pentaerythritol diphosphite; 2,6-di-tert-amyl-4-methylphenyl-phenyl-pentaerythritol diphosphite; bis(2,6-di-tert-amyl-4-methylphenyl)pentaerythritol diphosphite; and bis(2,6-di-tert-octyl-4-methylphenyl)pentaerythritol diphosphite.

Examples of hindered amine-based stabilizers include 4-acetoxy-2,2,6,6-tetra methyl piperidine; 4-stearoyloxy-2,2,6,6-tetramethylpiperidine; 4-acryloyloxy-2,2,6,6-tetramethylpiperidine; 4-(phenylacetoxy)-2,2,6,6-tetramethylpiperidine; 4-benzoyloxy-2,2,6,6-tetramethylpiperidine; 4-methoxy-2,2,6,6-tetramethylpiperidine; 4-stearyloxy-2,2,6,6-tetramethylpiperidine; 4-cyclohexyloxy-2,2,6,6-tetramethylpiperidine; 4-benzyloxy-2,2,6,6-tetramethylpiperidine; 4-phenoxy-2,2,6,6-tetramethylpiperidine; 4-(ethylcarbamoyloxy)-2,2,6,6-tetramethylpiperidine; 4-(cyclohexylcarbamoyloxy)-2,2,6,6-tetramethylpiperidine; 4-(phenylcarbamoyloxy)-2,2,6,6-tetramethylpiperidine; bis(2,2,6,6-tetramethyl-4-piperidyl)-carbonate; bis(2,2,6,6-tetramethyl-4-piperidyl)-oxalate; bis(2,2,6,6-tetramethyl-4-piperidyl)-malonate; bis(2,2,6,6-tetramethyl-4-piperidyl)-sebacate; bis(2,2,6,6-tetramethyl-4-piperidyl)-adipate; bis(2,2,6,6-tetramethyl-4-piperidyl)terephthalate; 1,2-bis(2,2,6,6-tetramethyl-4-piperidyloxy)-ethane; α,α'-bis(2,2,6,6-tetramethyl-4-piperidyloxy)-p-xylene; bis(2,2,6,6-tetramethyl-4-piperidyl)-tolylene-2,4-dicarbamate; bis(2,2,6,6-tetra methyl-4-piperidyl)-hexamethylene-1,6-dicarbamate; tris(2,2,6,6-tetramethyl-4-piperidyl)-benzene-1,3,5-tricarboxylate; tris(2,2,6,6-tetramethyl-4-piperidyl)-benzene-1,3,4-tricarboxylate; 1-[2-{3-(3,5-di-tert-butyl-4-hydroxyphenyl)propionyloxy}butyl]-4-[3-(3,5-di-tert-butyl-4-hydroxyphenyl)propionyloxy]2,2,6,6-tetramethylpiperidine; and a condensation product of 1,2,3,4-butanetetracarboxylic acid; 1,2,2,6,6-pentamethyl-4-piperidinol; and β,β,β',β'-tetramethyl-3,9-[2,4,8,10-tetraoxaspiro(5,5)undecane]diethanol.

Examples of triazine-based stabilizers include 2,4,6-tris(2'-hydroxy-4'-octyloxy-phenyl)-1,3,5-triazine; 2-(2'-hydroxy-4'-hexyloxy-phenyl)-4,6-diphenyl-1,3,5-triazine;

2-(2'-hydroxy-4'-octyloxyphenyl)-4,6-bis(2',4-dimethylphenyl)-1,3,5-triazine; 2-(2',4'-dihydroxyphenyl)-4,6-bis(2',4'-dimethylphenyl)-1,3,5-triazine; 2,4-bis(2'-hydroxy-4'-propyloxy-phenyl)-6-(2',4'-dimethylphenyl)-1,3,5-triazine; 2-(2-hydroxy-4-octyloxyphenyl)-4,6-bis(4'-methylphenyl)-1,3,5-triazine; 2-(2'-hydroxy-4'-dodecyloxyphenyl)-4,6-bis(2',4'-dimethylphenyl)-1,3,5-triazine; 2,4,6-tris(2'-hydroxy-4'-isopropyloxyphenyl)-1,3,5-triazine; 2,4,6-tris(2'-hydroxy-4'-n-hexyloxyphenyl)-1,3,5-triazine; and 2,4,6-tris(2'-hydroxy-4'-ethoxycarbonylmethoxyphenyl)-1,3,5-triazine.

Copper stabilizers include copper halides, e.g., chlorides, bromides, iodides. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, and copper complex salts coordinated to a chelating amine such as ethylenediamine and ethylenediaminetetraacetic acid.

In some embodiments, the polyamide composition includes a cerium-based heat stabilizer, e.g., cerium oxide, cerium hydrate, and/or cerium oxyhydrate.

The concentration of the heat stabilizer in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.1 wt % to 3 wt %, from 0.15 wt % to 1 wt %, from 0.32 wt % to 3.4 wt %, or from 0.48 wt % to 5 wt %. In some embodiments, the concentration of the heat stabilizer ranges from 0.2 wt % to 0.7 wt %. In terms of upper limits, the heat stabilizer concentration can be less than 5 wt %, e.g., less than 3.4 wt %, less than 3 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In terms of lower limits, the heat stabilizer concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the heat stabilizer comprises copper or a copper-containing compound such as, for example, copper iodide. After combining the heat stabilizer with the other polyamide composition components, the concentration of copper in the polyamide composition can, for example, range from 25 ppm to 700 ppm, e.g., from 25 ppm to 180 ppm, from 35 ppm to 260 ppm, from 49 ppm to 360 ppm, from 68 ppm to 500 ppm, or from 95 ppm to 700 ppm. In terms of upper limits, the concentration of copper in the polyamide composition can be less than 700 ppm, e.g., less than 500 ppm, less than 360 ppm, less than 260 ppm, less than 180 ppm, less than 130 ppm, less than 95 ppm, less than 68 ppm, less than 49 ppm, or less than 35 ppm. In terms of lower limits, the concentration of copper in the polyamide composition can be greater than 25 ppm, e.g., greater than 35 ppm, greater than 49 ppm, greater than 68 ppm, greater than 95 ppm, greater than 130 ppm, greater than 180 ppm, greater than 260 ppm, greater than 360 ppm, or greater than 500 ppm. Higher concentrations, e.g., greater than 700 ppm, and lower concentrations, e.g., less than 25 ppm, are also contemplated.

The weight ratio of the one or more polyamides to the heat stabilizer in the polyamide composition can, for example, range from 1 to 850, e.g., from 1 to 57, from 2 to 110, from 3.9 to 220, from 7.6 to 430, or from 15 to 850. In terms of upper limits, the weight ratio of the one or more polyamide polymers to the heat stabilizer can be less than 850, e.g., less than 430, less than 220, less than 110, less than 29, less than 57, less than 15, less than 7.6, less than 3.9, or less than 2. In terms of lower limits, the weight ratio of the one or more polyamide polymers to the heat stabilizer can be greater than 1, e.g., greater than 2, greater than 3.9, greater than 7.6, greater than 15, greater than 29, greater than 57, greater than 110, greater than 220, or greater than 430. Lower ratios, e.g., less than 1, and higher ratios, e.g., greater than 850, are also contemplated.

The weight ratio of glass fiber to the heat stabilizer in the polyamide composition can, for example, range from 2 to 600, e.g., from 2 to 61, from 3.5 to 110, from 6.3 to 190, from 11 to 340, or from 20 to 600. In terms of upper limits, the weight ratio of glass fiber to the heat stabilizer can be less than 600, e.g., less than 340, less than 190, less than 110, less than 61, less than 35, less than 20, less than 11, less than 6.3, or less than 3.5. In terms of lower limits, the weight ratio of glass fiber to the heat stabilizer can be greater than 2, e.g., greater than 3.5, greater than 6.3, greater than 11, greater than 20, greater than 35, greater than 61, greater than 110, greater than 190, or greater than 340. Lower ratios, e.g., less than 2, and higher ratios, e.g., greater than 600, are also contemplated.

The weight ratio of the impact modifier to the heat stabilizer in the polyamide composition can, for example, range from 0.5 to 300, e.g., from 0.5 to 23, from 0.95 to 44, from 1.8 to 83, from 10 to 40 from 12 to 35, from 3.4 to 160, or from 6.5 to 300. In terms of upper limits, the weight ratio of the impact modifier to the heat stabilizer can be less than 300, e.g., less than 160, less than 83, less than 44, less than 40, less than 35, less than 23, less than 12, less than 6.5, less than 3.4, less than 1.8, or less than 0.95. In terms of lower limits, the weight ratio of the impact modifier to the heat stabilizer can be greater than 0.5, e.g., greater than 0.95, greater than 1.8, greater than 3.4, greater than 6.5, greater than 10, greater than 12, greater than 23, greater than 44, greater than 83, or greater than 160. Lower ratios. e.g., less than 0.5, and higher ratios, e.g., greater than 300, are also contemplated.

Color Package (Nigrosine/Carbon Black)

The polyamide composition can include one or more soluble dyes such as nigrosine or solvent black 7. The concentration of the nigrosine in the polyamide composition can, for example, range from 0.1 to 5 wt %, e.g., from 0.1 wt % to 1 wt %, from 0.15 wt % to 1.5 wt %, from 0.22 wt % to 2.3 wt %, from 0.32 wt % to 3.4 wt %, or from 0.48 wt % to 5 wt %. In some embodiments, the concentration of the nigrosine ranges from 1 wt % to 2 wt %, e.g., from 1 wt % to 1.6 wt %, from 1.1 wt % to 1.7 wt %, from 1.2 wt % to 1.8 wt %, from 1.3 wt % to 1.9 wt %, or from 1.4 wt % to 2 wt %. In terms of upper limits, the nigrosine concentration can be less than 5 wt %, e.g., less than 3.4 wt %, less than 2.3 wt %, less than 2 wt %, less than 1.9 wt %, less than 1.8 wt %, less than 1.7 wt %, less than 1.6 wt %, less than 1.5 wt %, less than 1.4 wt %, less than 1.3 wt %, less than 1.2 wt %, less than 1.1 wt %, less than 1 wt %, less than 0.71 wt %, less than 0.48 wt %, less than 0.32 wt %, less than 0.22 wt %, or less than 0.15 wt %. In terms of lower limits, the nigrosine concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.1 wt %, greater than 1.2 wt %, greater than 1.3 wt %, greater than 1.4 wt %, greater than 1.5 wt %, greater than 1.6 wt %, greater than 1.7 wt %, greater than 1.8 wt %, greater than 1.9 wt %, greater than 2 wt %, greater than 2.3 wt %, or greater than 3.4 wt %. Lower concentrations, e.g., less than 0.1 wt %, and higher concentrations, e.g., greater than 5 wt %, are also contemplated. In some cases, the nigrosine is provided in a masterbatch, and the concentration of the nigrosine in the masterbatch and in the resultant composition can be easily calculated.

The weight ratio of the one or more polyamide polymers to the nigrosine in the polyamide composition can, for example, range from 1 to 85, e.g., from 1 to 14, from 1.6 to 22, from 2.4 to 35, from 3.8 to 55, or from 5.9 to 85. In terms of upper limits, the ratio of the one or more polyamide polymers to the nigrosine can be less than 85, e.g., less than 55, less than 35, less than 22, less than 14, less than 9.2, less than 5.9, less than 3.8, less than 2.4, or less than 1.6. In terms of lower limits, the ratio of the one or more polyamide polymers to the nigrosine can be greater than 1, e.g., greater than 1.6, greater than 2.4, greater than 3.8, greater than 5.9, greater than 9.2, greater than 14, greater than 22, greater than 35, or greater than 55. Higher ratios, e.g., greater than 55, and lower ratios, e.g., less than 1, are also contemplated.

The weight ratio of glass fiber to the nigrosine in the polyamide composition can, for example, range from 2 to 60, e.g., from 2 to 15, from 2.8 to 22, from 3.9 to 30, from 5.5 to 43, or from 7.8 to 60. In terms of upper limits, the ratio of glass fiber to the nigrosine can be less than 60, e.g., less than 43, less than 30, less than 22, less than 15, less than 11, less than 7.8, less than 5.5, less than 3.9, or less than 2.8. In terms of lower limits, the ratio of glass fiber to the nigrosine can be greater than 2, e.g., greater than 2.8, greater than 3.9, greater than 5.5, greater than 7.8, greater than 11, greater than 15, greater than 22, greater than 30, or greater than 43. Higher ratios, e.g., greater than 60, and lower ratios, e.g., less than 2, are also contemplated.

The weight ratio of the impact modifier to the nigrosine in the polyamide composition can, for example, range from 0.5 to 30, e.g., from 0.5 to 5.8, from 0.75 to 8.8, from 1.1 to 13, from 1.7 to 20, or from 2.6 to 30. In terms of upper limits, the ratio of the impact modifier to the nigrosine can be less than 30, e.g., less than 20, less than 13, less than 8.8, less than 5.8, less than 3.9, less than 2.6, less than 1.7, less than 1.1, or less than 0.75. In terms of lower limits, the ratio of the impact modifier to the nigrosine can be greater than 0.5, e.g., greater than 0.75, greater than 1.1, greater than 1.7, greater than 2.6, greater than 3.9, greater than 5.8, greater than 8.8, greater than 13, or greater than 20. Higher ratios, e.g., greater than 30, and lower ratios, e.g., less than 0.5, are also contemplated.

The weight ratio of the heat stabilizer to the nigrosine in the polyamide composition can, for example, range from 0.02 to 5, e.g., from 0.02 to 0.55, from 0.035 to 0.95, from 0.06 to 1.7, from 0.1 to 2.9, or from 0.18 to 5. In terms of upper limits, the ratio of the heat stabilizer to the nigrosine can be less than 5, e.g., less than 2.9, less than 1.7, less than 0.95, less than 0.55, less than 0.32, less than 0.18, less than 0.1, less than 0.06, or less than 0.035. In terms of lower limits, the ratio of the heat stabilizer to the nigrosine can be greater than 0.02, e.g., greater than 0.035, greater than 0.06, greater than 0.1, greater than 0.18, greater than 0.32, greater than 0.55, greater than 0.95, greater than 1.7, or greater than 2.9. Higher ratios, e.g., greater than 5, and lower ratios, e.g., less than 0.02, are also contemplated.

The polyamide composition can include one or more pigments such as carbon black. The concentration of the carbon black in the polyamide composition can, for example, range from 0.1 to 5 wt %, e.g., from 0.1 wt % to 1.05 wt %, from 0.15 wt % to 1.55 wt %, from 0.22 wt % to 2.29 wt %, from 0.32 wt % to 3.38 wt %, or from 0.48 wt % to 5 wt %. In some embodiments, the concentration of the carbon black ranges from 0.2 wt % to 0.8 wt %. In terms of upper limits, the carbon black concentration can be less than 5 wt %, e.g., less than 3.4 wt %, less than 2.3 wt %. less than 1.5 wt %, less than 1 wt %, less than 0.71 wt %, less than 0.48 wt %, less than 0.32 wt %, less than 0.22 wt %, or less than 0.15 wt %. In some embodiments, the concentration of the carbon black is less than 3 wt %. In terms of lower limits, the carbon black concentration can be greater than 0.1 wt %, e.g., greater than 0.15 wt %, greater than 0.22 wt %, greater than 0.32 wt %, greater than 0.48 wt %, greater than 0.71 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

Melt Stabilizer

The polyamide composition can include one or more melt stabilizers (lubricants). The type and relative amount of melt stabilizer can be selected to improve processing of the composition, and to contribute to the simultaneously high strength and ductility of the material. The concentration of the melt stabilizer in the polyamide composition can, for example, range from 0.1 to 5 wt %, e.g., from 0.1 wt % to 0.6 wt %, from 0.2 wt % to 0.7 wt %, from 0.3 wt % to 0.8 wt %, from 0.1 wt % to 3 wt %, from 0.4 wt % to 0.9 wt %, from 0.5 wt % to 1 wt %, from 0.15 wt % to 1.5 wt %, from 0.22 wt % to 2.3 wt %, from 0.32 wt % to 3.4 wt %, or from 0.48 wt % to 5 wt %. In terms of upper limits, the melt stabilizer concentration can be less than 5 wt %, e.g., less than 3.4 wt %, less than 2.3 wt %. less than 1.5 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %. In terms of lower limits, the melt stabilizer concentration can be greater than 0.1 wt %, e.g., greater than 0.2 wt %, greater than 0.3 w %, greater than 0.4 wt %, greater than 0.5 wt %, greater than 0.6 wt %, greater than 0.7 wt %, greater than 0.8 wt %, greater than 0.9 wt %, greater than 1 wt %, greater than 1.5 wt %, greater than 2.3 wt %, or greater than 3.4 wt %. Lower concentrations, e.g., less than 0.1 wt %, and higher concentrations, e.g., greater than 5 wt %, are also contemplated.

In some embodiments, the melt stabilizer comprises a saturated fatty acid. For example the melt stabilizer may comprise stearic acid, or behenic acid, or combinations thereof, or salts thereof. In some cases, the melt stabilizer comprises a stearate. The melt stabilizer, in some cases can include, for example, zinc stearate, calcium stearate, aluminum distearate, zinc stearate, calcium stearate, N,N' ethylene bis-stearamide, stearyl erucamide. In some cases, the melt stabilizer comprises stearic acid.

In some embodiments, the melt stabilizer does not include an ionic lubricant. In addition to other performance improvements, the disclosed melt stabilizers, also significantly improve dispersion of the components in the matrix of the polymer, e.g., the dispersion of the impact modifiers in the polyamide matrix.

In some embodiments, the melt stabilizer may be a wax. In some embodiments, the melt stabilizer consists of a wax. In some embodiments, the wax includes a fatty acid. In some embodiments, the melt stabilizer consists of a fatty acid. In some embodiments, the wax includes a saturated fatty acid. In some embodiments, the melt stabilizer consists of a saturated fatty acid. In some embodiments, the wax includes stearic acid, behenic acid, or salts or combinations thereof. In some embodiments, the wax consists of stearic acid, behenic acid, or salts or combinations thereof.

In addition to other performance improvements, the disclosed melt stabilizers, also significantly improve dispersion of the components in the matrix of the polymer, e.g., the dispersion of the impact modifiers in the polyamide matrix, which beneficially improves impact performance.

The concentration of the melt stabilizer, e.g., stearic acid or salt thereof, in the polyamide composition can, for example, range from 0.03 wt % to 4 wt %, e.g., from 0.03 wt % to 0.57 wt %, from 0.05 wt % to 0.92 wt %, from 0.08 wt % to 1.5 wt %, from 0.13 wt % to 2.5 wt %, or from 0.21 wt % to 4 wt %. In terms of upper limits, the stearic acid or salt concentration can be less than 4 wt %, e.g., less than 2.4 wt %, less than 1.5 wt %, less than 0.92 wt %, less than 0.57 wt %, less than 0.35 wt %, less than 0.21 wt %, less than 0.13 wt %, less than 0.08 wt %, or less than 0.05 wt %. In terms of lower limits, the stearic acid or salt concentration can be greater than 0.03 wt %, e.g., greater than 0.05 wt %, greater than 0.08 wt %, greater than 0.13 wt %, greater than 0.21 wt %, greater than 0.35 wt %, greater than 0.57 wt %, greater than 0.92 wt %, greater than 1.5 wt %, or greater than 2.5 wt %. Higher concentrations, e.g., greater than 4 wt %, and lower concentrations, e.g., less than 0.03 wt %, are also contemplated.

The weight ratio of the impact modifier to the melt stabilizer in the polyamide composition can, for example, range from 1 to 100, e.g., from 2 to 50, from 5 to 50, from 10 to 40, from 10 to 35, from 5 to 25, from 10 to 20, from 10 to 50, from 20 to 40, or from 25 to 35. In terms of upper limits, the ratio of the impact modifier to the melt stabilizer can be less than 100, e.g., less than 75, less than 50, less than 40, less than 35, less than 25, or less than 20. In terms of lower limits, the ratio of the impact modifier to the melt stabilizer can be greater than 1, e.g., greater than 2, greater than 5, greater than 10, greater than 20, or greater than 25. Higher ratios are also contemplated.

As noted above, the combination of the impact modifier and the melt stabilizer leads to synergistic combinations of performance features. Generally, impact modifiers are known to have detrimental effects on tensile strength. For example a degradation in shear of the polymer is observed (shear is detrimentally increased and tensile performance is adversely affected). However, when the disclosed impact modifiers and melt stabilizers are used together, an unexpected balance is struck, the melt stabilizers reduce or eliminate the degradation. As a result, little or no loss in tensile performance is observed, while surprisingly impact resilience is significantly improved.

Other Additives

The polyamide composition can also include one or more chain terminators, viscosity modifiers, plasticizers, UV stabilizers, catalysts, other polymers, flame retardants, delusterants, antimicrobial agents, antistatic agents, optical brighteners, extenders, processing aids, talc, mica, gypsum, wollastonite and other commonly used additives known to those of skill in the art. Additional suitable additives may be found in Plastics Additives, An A-Z reference, Edited by Geoffrey Pritchard (1998). The optional addition of a stabilizer to the additive dispersion is present in an exemplary embodiment. Stabilizers suitable for the additive dispersion include, but are not limited to, polyethoxylates (such as the polyethoxylated alkyl phenol Triton X-100), polypropoxylates, block copolymeric polyethers, long chain alcohols, polyalcohols, alkyl sulfates, alkyl-sulfonates, alkyl-benzenesulfonates, alkylphosphates, alkyl-phosphonates, alkyl-naphthalene sulfonates, carboxylic acids and perfluoronates.

In some embodiments, the stain resistance of the polyamide composition can be improved by salt-blending the polyamide precursor with a cationic dye modifier, such as 5-sulfoisophthalic acid or salts or other derivatives thereof.

Chain extenders can also be included in the polyamide composition. Suitable chain extender compounds include bis-N-acyl bislactam compounds, isophthaloyl bis-caprolactam (IBC), adipoyl bis-caprolactam (ABC), terphthaloyl bis-caprolactam (TBS), and mixtures thereof.

The polyamide composition can also include anti-block agents. Inorganic solids, usually in the form of diatomaceous earth, represent one class of materials that can be added to the disclosed polyamide composition. Non-limiting examples include calcium carbonate, silicon dioxide, magnesium silicate, sodium silicate, aluminum silicate, aluminum potassium silicate, and silicon dioxide are examples of suitable antiblock agents.

The disclosed polyamide compositions can also include a nucleating agent to further improve clarity and oxygen barrier as well as enhance oxygen barrier. Typically, these agents are insoluble, high melting point species that provide a surface for crystallite initiation. By incorporating a nucleating agent, more crystals are initiated, which are smaller in nature. More crystallites or higher % crystallinity correlates to more reinforcement/higher tensile strength and a more tortuous path for oxygen flux (increased barrier); smaller crystallites decreases light scattering which correlates to improved clarity. Non-limiting examples include calcium fluoride, calcium carbonate, talc and Nylon 2,2.

The polyamide compositions can also include organic anti-oxidants in the form of hindered phenols such as, but not limited to, Irganox 1010, Irganox 1076 and Irganox 1098; organic phosphites such as, but not limited to, Irgafos 168 and Ultranox 626; aromatic amines, metal salts from Groups IB, IIB, III, and IV of the periodic table and metal halides of alkali and alkaline earth metals.

Mechanical Performance Properties

The polyamide composition can demonstrate a tensile modulus that, for example, ranges from 2500 MPa to 25000 MPa, e.g., from 2500 MPa to 16000 MPa, from 4750 MPa to 18250 MPa, from 7000 MPa to 20500 MPa, from 5000 MPa to 17000 MPa, from 7000 MPa to 15000 MPa, from 8000 MPa to 12000 MPa, from 8600 MPa to 11500 MPa, from 9250 MPa to 22750 MPa, or from 11500 MPa to 25000 MPa. In terms of upper limits, the tensile modulus can be less than 25000 MPa, e.g., less than 22750 MPa, less than 20500 MPa, less than 18250 MPa, less than 17000 MPa, less than 16000 MPa, less than 15000 MPa, less than 13750 MPa, less than 12000 MPa, less than 11500 MPa, less than 9250 MPa, less than 7000 MPa, or less than 4750 MPa. In terms of lower limits, the tensile modulus can be greater than 2500 MPa, e.g., greater than 4750 MPa, greater than 5000 MPa, greater than 7000 MPa, greater than 8000 MPa, greater than 8600 MPa, greater than 9250 MPa, greater than 11500 MPa, greater than 13750 MPa, greater than 16000 MPa, greater than 18250 MPa, greater than 20500 MPa, or greater than 22750 MPa. Higher tensile moduli, e.g., greater than 25000 MPa, and lower tensile moduli, e.g., less than 2500 MPa, are also contemplated. The tensile modulus of the polyamide composition can be measured using a standard protocol such as ISO 527-1 (2019).

The polyamide composition can demonstrate a tensile strength at break that, for example, ranges from 60 MPa to 300 MPa, e.g., from 60 MPa to 204 MPa, from 84 MPa to 228 MPa, from 108 MPa to 252 MPa, from 132 MPa to 276 MPa, from 135 MPa to 200 MPa, from 140 MPa to 190 MPa, from 145 MPa to 180 MPa, or from 156 MPa to 300 MPa. In terms of upper limits, the tensile strength at break can be less than 300 MPa, e.g., less than 276 MPa, less than 252 MPa, less than 228 MPa, less than 228 MPa, less than 204 MPa, less than 200 MPa, less than 190 MPa, less than 180 MPa, less than 156 MPa, less than 132 MPa, less than 108 MPa, or less than 84 MPa. In terms of lower limits, the tensile strength at break can be greater than 60 MPa, e.g., greater than 84 MPa, greater than 108 MPa, greater than 132 MPa, greater than 135 MPa, greater than 140 MPa, greater than 145 MPa, greater than 156 MPa, greater than 180 MPa, greater than 204 MPa, greater than 228 MPa, greater than 252 MPa, or greater than 276 MPa. Higher tensile strengths, e.g., greater than 300 MPa, and lower tensile strengths, e.g., less than 60 MPa, are also contemplated. The tensile strength at break of the polyamide composition can be measure using a standard protocol such as ISO 527-1 (2019).

The polyamide composition can demonstrate an elongation (tensile) at break that, for example, ranges from 2.5% to 67.5%, e.g., from 2.5% to 41.5%, from 2.5% to 5%, from 2.7% to 4%, from 2.8% to 3.9%, from 9% to 48%, from 15.5% to 54.5%, from 22% to 61%, or from 28.5% to 67.5%. The composition can have an elongation at break ranging from 2.5% to 5%, e.g., from 2.5% to 4%, from 2.75% to 4.25%, from 3% to 4.5%, from 3.25% to 4.75%, or from 3.5% to 5%. In terms of upper limits, the elongation at break can be less than 67.5%, e.g., less than 61%, less than 54.5%, less than 48%, less than 41.5%, less than 35%, less than 28.5%, less than 22%, less than 15.5%, less than 9%, less than 5%, less than 4%, less than 3.9%, less than 4.75%, less than 4.5%, less than 4.25%, less than 4%, less than 3.75%, less than 3.5%, less than 3.25%, less than 3%, or less than 2.75%. In terms of lower limits, the elongation at break can be greater than 2.5%, e.g., greater than 2.7%, greater than 2.75%, greater than 2.8%, greater than 3%, greater than 3.25%, greater than 3.5%, greater than 3.75%, greater than 4%, greater than 4.25%, greater than 4.5%, greater than 4.75%, greater than 5%, greater than 9%, greater than 15.5%, greater than 22%, greater than 28.5%, greater than 35%, greater than 41.5%, greater than 48%, greater than 54.5%, or greater than 61%. Larger elongations, e.g., greater than 67.5%, and smaller elongations, e.g., less than 2.5%, are also contemplated. The elongation at break of the polyamide composition can be measured using a standard protocol such as ISO 527-1 (2019, The polyamide composition can demonstrate a flexural modulus that, for example, ranges from 2500 MPa to 25000 MPa, e.g., from 2500 MPa to 16000 MPa, from 4750 MPa to 18250 MPa, from 7000 MPa to 20500 MPa, from 8500 MPa to 12000 MPa, from 8700 MPa to 11000 MPa, from 8900 MPa to 10000 MPa, from 9250 MPa to 22750 MPa, or from 11500 MPa to 25000 MPa. In terms of upper limits, the flexural modulus can be less than 25000 MPa, e.g., less than 22750 MPa, less than 20500 MPa, less than 18250 MPa, less than 16000 MPa, less than 13750 MPa, less than 12000 MPa, less than 11500 MPa, less than 11000 MPa, less than 10000 MPa, less than 9250 MPa, less than 7000 MPa, or less than 4750 MPa. In terms of lower limits, the flexural modulus can be greater than 2500 MPa, e.g., greater than 4750 MPa, greater than 7000 MPa, greater than 8500 MPa, greater than 8700 MPa, greater than 8900 MPa, greater than 9250 MPa, greater than 11500 MPa, greater than 13750 MPa, greater than 16000 MPa, greater than 18250 MPa, greater than 20500 MPa, or greater than 22750 MPa. Higher flexural moduli, e.g., greater than 25000 MPa, and lower flexural moduli, e.g., less than 2500 MPa, are also contemplated. The flexural modulus of the polyamide composition can be measured using a standard protocol such as ISO 178 (2019).

The polyamide composition can demonstrate a flexural strength at break that, for example, ranges from 100 MPa to 450 MPa, e.g., from 100 MPa to 310 MPa, from 135 MPa to 345 MPa, from 170 MPa to 380 MPa, from 205 MPa to 415 MPa, from 225 MPa to 350 MPa, from 230 MPa to 300 MPa, from 240 MPa to 280 MPa, or from 240 MPa to 450 MPa. In terms of upper limits, the flexural strength at break can be less than 450 MPa, e.g., less than 415 MPa, less than 380 MPa, less than 350 MPa, less than 345 MPa, less than 310 MPa, less than 300 MPa, less than 280 MPa, less than 275 MPa, less than 240 MPa, less than 205 MPa, less than 170 MPa, or less than 135 MPa. In terms of lower limits, the flexural strength at break can be greater than 100 MPa, e.g., greater than 135 MPa, greater than 170 MPa, greater than 205 MPa, greater than 225 MPa, greater than 230 MPa, greater than 240 MPa, greater than 275 MPa, greater than 310 MPa, greater than 345 MPa, greater than 380 MPa, or greater than 415 MPa. Higher strengths, e.g., greater than 450 MPa, and lower strengths, e.g., less than 100 MPa, are also contemplated. The flexural strength at break of the polyamide composition can be measured using a standard protocol such as ISO 178 (2019).

The polyamide composition can demonstrate a notched Izod impact energy loss at 23° C. that, for example, ranges from 5 kJ/m$^2$ to 50 kJ/m$^2$, e.g., from 5 kJ/m$^2$ to 32 kJ/m$^2$, from 9.5 kJ/m$^2$ to 36.5 kJ/m$^2$, from 14 kJ/m$^2$ to 41 kJ/m$^2$, from 18.5 kJ/m$^2$ to 45.5 kJ/m$^2$, or from 23 kJ/m$^2$ to 50 kJ/m$^2$. In terms of upper limits, the notched Izod impact energy loss at 23° C. can be less than 50 kJ/m$^2$, e.g., less than 45.5 kJ/m$^2$, less than 41 kJ/m$^2$, less than 36.5 kJ/m$^2$, less than 32 kJ/m$^2$, less than 27.5 kJ/m$^2$, less than 23 kJ/m$^2$, less than 18.5 kJ/m$^2$, less than 14 kJ/m$^2$, or less than 9.5 kJ/m$^2$. In terms of lower limits, the notched Izod impact energy loss at 23° C. can be greater than 5 kJ/m$^2$, e.g., greater than 9.5 kJ/m$^2$, greater than 14 kJ/m$^2$, greater than 18.5 kJ/m$^2$, greater than 23 kJ/m$^2$, greater than 27.5 kJ/m$^2$, greater than 32 kJ/m$^2$, greater than 36.5 kJ/m$^2$, greater than 41 kJ/m$^2$, or greater than 45.5 kJ/m$^2$. Higher Izod impact energy losses at 23° C., e.g., greater than 50 kJ/m$^2$, and lower Izod impact energy losses at 23° C., e.g., less than 5 kJ/m$^2$, are also contemplated. The notched Izod impact energy loss of the polyamide composition can be measured using a standard protocol such as ISO 180 (2019).

The polyamide composition can demonstrate a notched Izod impact energy loss at −40° C. that, for example, ranges from 3 kJ/m$^2$ to 30 kJ/m$^2$, e.g., from 3 kJ/m$^2$ to 19.2 kJ/m$^2$, from 5.7 kJ/m$^2$ to 21.9 kJ/m$^2$, from 8.4 kJ/m$^2$ to 24.6 kJ/m$^2$, from 11.1 kJ/m$^2$ to 27.3 kJ/m$^2$, or from 13.8 kJ/m$^2$ to 30 kJ/m$^2$/In terms of upper limits, the notched Izod impact energy loss at −40° C. can be less than 30 kJ/m$^2$, e.g., less than 27.3 kJ/m$^2$, less than 24.6 kJ/m$^2$, less than 21.9 kJ/m$^2$, less than 19.2 kJ/m$^2$, less than 16.5 kJ/m$^2$, less than 13.8 kJ/m$^2$, less than 11.1 kJ/m$^2$, less than 8.4 kJ/m$^2$, or less than 5.7 kJ/m$^2$. In terms of lower limits, the notched Izod impact energy loss at −40° C. can be greater than 3 kJ/m$^2$, e.g., greater than 5.7 kJ/m$^2$, greater than 8.4 kJ/m$^2$, greater than 11.1 kJ/m$^2$, greater than 13.8 kJ/m$^2$, greater than 16.5 kJ/m$^2$, greater than 19.2 kJ/m$^2$, greater than 21.9 kJ/m$^2$, greater than 24.6 kJ/m$^2$, or greater than 27.6 kJ/m$^2$. Higher Izod impact energy losses at −40° C., e.g., greater than 30 kJ/m$^2$, and lower Izod impact energy losses at −40° C., e.g., less than 3 kJ/m$^2$, are also contemplated.

The polyamide composition can demonstrate a Charpy notched impact energy loss at 23° C. that, for example, ranges from 6 kJ/m$^2$ to 36 kJ/m$^2$, e.g., from 6 kJ/m$^2$ to 24 kJ/m$^2$, from 9 kJ/m$^2$ to 27 kJ/m$^2$, from 10 kJ/m$^2$ to 35 kJ/m$^2$, from 10 kJ/m$^2$ to 27 kJ/m$^2$, from 11 kJ/m$^2$ to 25 kJ/m$^2$, from 12 kJ/m² to 30 kJ/m², from 15 kJ/m² to 33 kJ/m², or from 18 kJ/m² to 36 kJ/m². In terms of upper limits, the Charpy notched impact energy loss at 23° C. can be less than 36 kJ/m², e.g., less than 35 kJ/m², less than 33 kJ/m², less than 30 kJ/m², less than 27 kJ/m², less than 25 kJ/m², less than 24 kJ/m², less than 21 kJ/m², less than 18 kJ/m², less than 15 kJ/m², less than 12 kJ/m², or less than 9 kJ/m². In terms of lower limits, the Charpy notched impact energy loss at 23° C. can be greater than 6 kJ/m², e.g., greater than 9 kJ/m², greater than 10 kJ/m², greater than 11 kJ/m², greater than 12 kJ/m², greater than 15 kJ/m², greater than 18 kJ/m², greater than 21 kJ/m², greater than 24 kJ/m², greater than 27 kJ/m², greater than 30 kJ/m², or greater than 33 kJ/m². Higher Charpy impact energy losses, e.g., greater than 36 kJ/m², and lower Charpy impact energy losses, e.g., less than 3 kJ/m², are also contemplated. The Charpy notched impact energy loss of the polyamide composition can be measured using a standard protocol such as ISO 179-1 (2010).

The polyamide composition can demonstrate a Charpy un-notched impact energy loss at 23° C. that, for example, ranges from 70 kJ/m² to 150 kJ/m², e.g., from 70 kJ/m² to 120 kJ/m², from 70 kJ/m² to 100 kJ/m², from 72 kJ/m² to 98 kJ/m², from 75 kJ/m² to 95 kJ/m², from 80 kJ/m² to 95 kJ/m², or from 84 kJ/m² to 93 kJ/m². In terms of upper limits, the Charpy un-notched impact energy loss at 23° C. can be less than 150 kJ/m², e.g., less than 120 kJ/m², less than 100 kJ/m², less than 98 kJ/m², less than 95 kJ/m², or less than 93 kJ/m². In terms of lower limits, the Charpy un-notched impact energy loss at 23° C. can be greater than 70 kJ/m², e.g., greater than 72 kJ/m², greater than 75 kJ/m², greater than 80 kJ/m², greater than 83 kJ/m², or greater than 84 kJ/m². Higher Charpy impact energy losses, e.g., greater than 150 kJ/m², and lower Charpy impact energy losses, e.g., less than 70 kJ/m², are also contemplated. The Charpy un=notched impact energy loss of the polyamide composition can be measured using a standard protocol such as ISO 179-1 (2010).

The polyamide composition can demonstrate a Charpy notched impact energy loss at −40° C. that, for example, ranges from 5 kJ/m² to 50 kJ/m², e.g., from 5 kJ/m² to 30 kJ/m², from 6 kJ/m² to 20 kJ/m², from 7 kJ/m² to 18 kJ/m², from 8 kJ/m² to 17 kJ/m², or from 9 kJ/m² to 15 kJ/m². In terms of upper limits, the Charpy un-notched impact energy loss at −40° C. can be less than 50 kJ/m², e.g., less than 30 kJ/m², less than 20 kJ/m², less than 18 kJ/m², less than 17 kJ/m², or less than 15 kJ/m². In terms of lower limits, the Charpy un-notched impact energy loss at −40° C. can be greater than 5 kJ/m², e.g., greater than 6 kJ/m², greater than 7 kJ/m², greater than 8 kJ/m², or greater than 9 kJ/m². Higher Charpy impact energy losses, e.g., greater than 50 kJ/m², and lower Charpy impact energy losses, e.g., less than 5 kJ/m², are also contemplated. The Charpy notched impact energy loss of the polyamide composition can be measured using a standard protocol such as ISO 179-1 (2010).

The polyamide composition can demonstrate a Charpy un-notched impact energy loss at −40° C. that, for example, ranges from 65 kJ/m² to 150 kJ/m², e.g., from 65 kJ/m² to 120 kJ/m², from 65 kJ/m² to 110 kJ/m², from 70 kJ/m² to 110 kJ/m², from 72 kJ/m² to 105 kJ/m², from 73 kJ/m² to 105 kJ/m², or from 74 kJ/m² to 98 kJ/m². In terms of upper limits, the Charpy un-notched impact energy loss at −40° C. can be less than 150 kJ/m², e.g., less than 120 kJ/m², less than 110 kJ/m², less than 105 kJ/m², or less than 98 kJ/m². In terms of lower limits, the Charpy un-notched impact energy loss at −40° C. can be greater than 65 kJ/m², e.g., greater than 70 kJ/m², greater than 72 kJ/m², greater than 73 kJ/m², or greater than 74 kJ/m². Higher Charpy impact energy losses, e.g., greater than 150 kJ/m², and lower Charpy impact energy losses, e.g., less than 65 kJ/m², are also contemplated. The Charpy un-notched impact energy loss of the polyamide composition can be measured using a standard protocol such as ISO 179-1 (2010).

The polyamide composition can demonstrate a tan delta (at 60° C.) that, for example, ranges from 0.04 au to 0.5 au, e.g., from 0.04 au to 0.4 au, from 0.042 au to 0.2 au, from 0.044 au to 0.15 au, or from 0.046 to 0.1 au. In terms of upper limits, the tan delta (at 60° C.) can be less than 0.5 au, e.g., less than 0.4 au, less than 0.2 au, less than 0.15 au, or less than 0.1 au. In terms of lower limits, the tan delta (at 60° C.) can be greater than 0.04 au, e.g., greater than 0.042 au, greater than 0.044 au, or greater than 0.046 au. The tan delta (at 60° C.) of the polyamide composition can be measured using the centerpoint beam technique.

The polyamide composition can demonstrate a tan delta (at 90° C.) that, for example, ranges from 0.143 au to 0.75 au, e.g., from 0.175 au to 0.6 au, from 0.19 au to 0.5 au, from 0.2 au to 0.4 au, or from 0.215 to 0.3 au. In terms of upper limits, the tan delta (at 90° C.) can be less than 0.75 au, e.g., less than 0.6 au, less than 0.5 au, less than 0.4 au, or less than 0.3 au. In terms of lower limits, the tan delta (at 90° C.) can be greater than 0.143 au, e.g., greater than 0.175 au, greater than 0.19 au, greater than 0.2 au, or greater than 0.215 au. The tan delta (at 90° C.) of the polyamide composition can be measured using the centerpoint beam technique.

In some embodiments, the polyamide compositions demonstrate improved maximum tan delta performance. In some cases, maximum tan delta is greater than 0.055, e.g., greater than 0.057, greater than 0.059, greater than 0.061, or greater than 0.063. The maximum tan delta may be measured using Dynamic Mechanical Analysis In one embodiment, the impact-modified polyamide composition comprises from 45 wt % to 60 wt % polyamide polymer comprising PA-6 and/or PA-6,6; from 20 wt % to 50 wt % glass fiber; from 2 wt % to 25 wt % impact modifier; from 0.1 wt % to 3 wt % melt stabilizer (weight ratio of the impact modifier to the melt stabilizer ranging from 10 to 40), wherein the composition demonstrates an un-notched Charpy impact energy loss at 23° C. that is greater than 80 kJ/m²; an un-notched Charpy impact energy loss at −40° C. that is greater than 70 kJ/m²; a notched Charpy impact energy loss at 23° C. that is greater than 11 kJ/m²; a notched Charpy impact energy loss at −40° C. that is greater than 10 kJ/m²; a tensile strength greater than 135 MPa, and a tan delta (at 90° C.) that is greater than 0.175 au.

In one embodiment, the impact-modified polyamide composition comprises from 51 wt % to 57 wt % polyamide polymer comprising PA-6 and/or PA-6,6; 4.0 wt % to 15 wt % impact modifier comprising a maleic anhydride-modified olefin, acrylate, or acrylic, or combinations thereof; from 0.1 wt % to 3 wt % melt stabilizer comprising a saturated fatty acid (weight ratio of the impact modifier to the melt stabilizer ranging from 10 to 35), wherein the composition demonstrates an un-notched Charpy impact energy loss at 23° C. that is greater than 83 kJ/m²; an un-notched Charpy impact energy loss at −40° C. that is greater than 73 kJ/m²; a tensile strength greater than 145 MPa, and a tan delta (at 90° C.) that is greater than 0.19 au.

In one embodiment, the impact-modified polyamide composition comprises from 51 wt % to 57 wt % polyamide polymer comprising PA-6 and/or PA-6,6; 4.0 wt % to 15 wt % impact modifier comprising maleic anhydride-modified ethylene octene and/or ethylene acrylate, from 0.1 wt % to 3 wt % melt stabilizer comprising stearic acid, or behenic acid, or combinations thereof, or salts thereof (weight ratio of the impact modifier to the melt stabilizer ranging from 10 to 35), wherein the composition demonstrates an un-notched Charpy impact energy loss at 23° C. that is greater than 83 kJ/m$^2$; an un-notched Charpy impact energy loss at −40° C. that is greater than 73 kJ/m$^2$; a notched Charpy impact energy loss at 23° C. that is greater than 11 kJ/m$^2$; a notched Charpy impact energy loss at −40° C. that is greater than 10 kJ/m$^2$; a tensile strength greater than 145 MPa, and a tan delta (at 90° C.) that is greater than 0.21 au.

Methods of Preparation

The present disclosure also relates to processes of producing the provided impact-modified polyamide compositions. The methods include providing one or more polyamide polymers, glass fiber, one or more impact modifiers, and optionally one or more heat stabilizers. The methods can further include selecting the type and relative amounts of the one or more polyamide polymers, glass fiber, one or more impact modifiers, and one or more heat stabilizers to provide desired mechanical properties to the resulting polyamide composition. The methods further include combining the one or more polyamide polymers, glass fiber, one or more impact modifiers, and one or more heat stabilizers to produce the polyamide composition. In some embodiments, the methods further include selecting, providing, and/or combining one or more dyes such as nigrosine, one or more pigments such as carbon black, and/or one or more melt stabilizers.

The components of the polyamide composition can be mixed and blended together to produce the polyamide composition, or can be formed in situ using appropriate reactants. The terms "adding" or "combining" without further clarification are intended to encompass either the addition of the material itself to the composition or the in situ formation of the material in the composition. In another embodiment, two or more materials to be combined with the composition are simultaneously added via masterbatch.

Molded Articles

The present disclosure also relates to articles that include any of the provided impact-modified polyamide compositions. The article can be produced, for example, via conventional injection molding, extrusion molding, blow molding, press molding, compression molding, or gas assist molding techniques. Molding processes suitable for use with the disclosed compositions and articles are described in U.S. Pat. Nos. 8,658,757; 4,707,513; 7,858,172; and 8,192,664, each of which is incorporated herein by reference in its entirety for all purposes. Examples of articles that can be made with the provided polyamide compositions include those used in electrical and electronic applications (such as, but not limited to, circuit breakers, terminal blocks, connectors and the like), automotive applications (such as, but not limited to, air handling systems, radiator end tanks, fans, shrouds, and the like), furniture and appliance parts, and wire positioning devices such as cable ties.

EXAMPLES

Examples 1-7 and Comparative Examples A-C were prepared by combining components as shown in Table 1 and compounding in a twin screw extruder. Polymers were melted, additives were added to the melt, and the resultant mixture was extruded and pelletized. Percentages are expressed as weight percentages. Maleic anhydride-modified olefin, maleic anhydride-modified olefin acrylate, maleic anhydride-modified acrylic, and maleic anhydride-modified polyolefin were used as impact modifiers. Stearic acid was used as the melt stabilizer.

TABLE 1

Example and Comparative Example Compositions

| Component | Ex. 1 | Ex. 2 | Ex. 3 | Ex. 4 | Ex. 5 |
|---|---|---|---|---|---|
| PA-66 | 52% | 52% | 52% | 52% | 52% |
| Glass Fiber | 34% | 34% | 34% | 34% | 34% |
| Heat Stabilizer (masterbatch) | 0.35% | 0.35% | 0.35% | 0.35% | 0.35% |
| Carbon Black (masterbatch) | 0.5% | 0.5% | 0.5% | 0.5% | 0.5% |
| Nigrosine (masterbatch) | 1.5% | 1.5% | 1.5% | 1.5% | 1.5% |
| Impact Modifier | 11.5% (1) | 11.5% (2) | 11.5% (3) | 11.5% (1) | 11.5% (1) |
| Melt stabilizer | 0.37% | 0.37% | 0.37% | 0.37% | 0.37% |
| IM:Melt stabilizer Weight Ratio | 31.1 | 31.1 | 31.1 | 31.1 | 31.1 |

| Component | Ex. 6 | Ex. 7 | Comp. A | Comp. B | Comp. C |
|---|---|---|---|---|---|
| PA-66 | 52% | 55% | 63.5% | 61% | 52% |
| Glass Fiber | 34% | 36% | 34% | 36% | 34% |
| Heat Stabilizer (masterbatch) | 0.35% | 0.35% | 0.35% | 0.35% | 0.35% |
| Carbon Black (masterbatch) | 0.5% | 0.5% | 0.5% | 0.5% | 0.5% |
| Nigrosine (masterbatch) | 1.5% | 1.5% | 1.5% | 1.5% | 1.5% |
| Impact Modifier | 11.5% (1) | 6.0 (1) | — | — | 11.5% (1) |
| Melt stabilizer | 0.37% | 0.37% | 0.37% | 0.37% | — |
| IM:Melt stabilizer Weight Ratio | 31.1 | 16.2 | | | |

IM 1: Maleic anhydride-modified (grafted) elastomer
IM 2: Maleic anhydride-modified ethylene acrylate copolymer
IM 3: Maleic anhydride-modified acrylic Panels were formed from the pellets, and the panels were tested for tensile strength, tensile elongation, tensile modulus, flexural strength, flexural modules. The panels were also tested for impact resistance—both notched and un-notched Charpy, at 23° C. and −40° C. The results are shown in Tables 2a and 2b.

TABLE 2a

Test Results

| | Units | Ex. 1 | Ex. 2 | Ex. 3 | Ex. 4 | Ex. 5 |
|---|---|---|---|---|---|---|
| Tensile Strength | MPa | 166 | 171 | 175 | 163 | 166 |
| Tensile Elongation | % | 3.41 | 3.29 | 3.29 | 3.73 | 3.67 |
| Tensile Modulus | MPa | 8853 | 9925 | 10640 | 9498 | 9893 |
| Flexural Strength | MPa | 254 | 255 | 266 | 241 | 250 |

TABLE 2a-continued

| | | Test Results | | | | |
|---|---|---|---|---|---|---|
| Flexural Modulus | MPa | 9611 | 9494 | 9971 | 8951 | 9332 |
| Impact resistance; Un-notched Charpy; 23° C. | kJ/m$^2$ | 88 | 84 | 87 | 90 | 87 |
| Impact resistance; Un-notched Charpy; −40° C. | kJ/m$^2$ | 93 | 90 | 74 | 97 | 95 |
| Impact resistance; Notched Charpy; 23° C. | kJ/m$^2$ | 18 | 15 | 12 | 18 | 17 |
| Impact resistance; Notched Charpy; −40° C. | kJ/m$^2$ | 14 | 10 | 9 | 14 | 13 |

| | Units | Ex. 6 | Ex. 7 | Comp. A | Comp. B | Comp. C |
|---|---|---|---|---|---|---|
| Tensile Strength | MPa | 147 | 173 | 205 | 210 | 134.5 |
| Tensile Elongation | % | 3.2 | 2.9 | 3 | 3 | 3.3 |
| Tensile Modulus | MPa | 9300 | 11300 | 10600 | 11600 | 8577 |
| Flexural Strength | MPa | — | — | — | — | — |
| Flexural Modulus | MPa | — | — | — | — | — |
| Impact resistance; Un-notched Charpy; 23° C. | kJ/m$^2$ | 87 | 93 | 80 | 80 | 86 |
| Impact resistance; Un-notched Charpy; −40° C. | kJ/m$^2$ | 94 | 98 | 70 | 70 | — |
| Impact resistance; Notched Charpy; 23° C. | kJ/m$^2$ | 23 | 18 | 11 | 11 | 23 |
| Impact resistance; Notched Charpy; −40° C. | kJ/m$^2$ | 15 | 14 | 10 | 12 | — |

As shown, the disclosed compositions demonstrated a synergistic combination of tensile/flexural properties and impact resistant properties. For example, the disclosed compositions demonstrate both a 23° C. un-notched Charpy impact measurement greater than 80 kJ/m$^2$ and a tensile strength greater than 135 MPa. Typically, formulations that have good tensile/flexural performance have less than desirable impact resistance performance and vice versa. In particular, when modified olefins are employed as the impact modifier (Examples 1 and 4-7), along with the tensile/flexural properties, the impact resistance is particularly good, especially the notched Charpy performance.

Also, the test results show the importance of the combination of impact modifier and melt stabilizer, optionally in the disclosed amounts. The formulations of Examples 1, 6, and 7 include both an impact modifier and a melt stabilizer (in the disclosed amounts and ratios, e.g., an impact modifier:melt stabilizer weight ratio less than 100, e.g., less than 50). These formulations lead to a synergistic combination of tensile/flexural and impact resistant properties. In contrast, Comparative Example C has a composition similar to Examples 1, 6, and 7, but does not include the amounts of melt stabilizer. Surprisingly, both the tensile/flexural and the impact resistant properties of Comparative Example C are worse than those of Examples 1, 6, and 7, with the tensile performance being significantly worse (147 MPa and 173 MPa versus 134.5). Stated another way, the inclusion of the stearic acid melt stabilizer in the formulations unexpectedly provides for a 10% improvement in tensile strength.

Examples 6 and 7 and Comparative Examples A and B were tested for tan delta, (dry as molded formulations).

TABLE 3

| | Test Results | | | | |
|---|---|---|---|---|---|
| | Units | Ex. 6 | Ex. 7 | Comp A | Comp B |
| Tan delta at 22.4° C. | au | 0.006 | 0.005 | 0.004 | 0.005 |
| Tan delta at 60° C. | au | 0.062 | 0.059 | 0.046 | 0.076 |
| Tan delta at 90° C. | au | 0.235 | 0.216 | 0.143 | 0.133 |

| | | Ex. 1 | Comp. A |
|---|---|---|---|
| Max tan delta | au | 0.068 | 0.055 |

The results in Table 3 show that the disclosed compositions demonstrated surprisingly good tan delta performance. Tan delta is an indicator of a compound's ability to dissipate energy. As shown, the disclosed formulations demonstrate tan delta measurements that are particularly good at higher temperatures, e.g., temperatures above 60°. For example, the formulations demonstrate an improvement of at least 50% (0.143 and 0.133 vs. 0.216 and 0.235) at 90° C.

The results show that the disclosed formulations demonstrate particularly good performance in the Noise Vibration Harshness (NVH) arena, e.g., automotive interior applications. The compositions also demonstrate significant improvements in maximum tan delta.

EMBODIMENTS

The following embodiments are contemplated. All combinations of features and embodiments are contemplated.

Embodiment 1

An impact-modified polyamide composition comprising: from 5 wt % to 85 wt % of one or more polyamide polymers; from 10 wt % to 60 wt % glass fiber; from 3 wt % to 30 wt % of an impact modifier; and optionally, a heat stabilizer at a concentration less than 5 wt %; wherein the polyamide composition has a notched Izod impact energy loss at 23° C. that is greater than 5 kJ/m² and a flexural modulus greater than 2.5 GPa.

Embodiment 2

An embodiment of embodiment 1, wherein the weight ratio of the one or more polyamide polymers to the glass fiber ranges from 0.1 to 10.

Embodiment 3

An embodiment of embodiment 1 or 2, wherein the weight ratio of the one or more polyamide polymers to the impact modifier ranges from 0.2 to 30.

Embodiment 4

An embodiment of any of the embodiments of embodiment 1-3, wherein the weight ratio of the one or more polyamide polymers to the heat stabilizer ranges from 1 to 850.

Embodiment 5

An embodiment of any of the embodiments of embodiment 1-4, wherein the weight ratio of the glass fiber to the impact modifier ranges from 0.3 to 20.

Embodiment 6

An embodiment of any of the embodiments of embodiment 1-5, wherein the weight ratio of the glass fiber to the heat stabilizer ranges from 2 to 600.

Embodiment 7

An embodiment of any of the embodiments of embodiment 1-6, wherein the weight ratio of the impact modifier to the heat stabilizer ranges from 0.5 to 300.

Embodiment 8

An embodiment of any of the embodiments of embodiment 1-7, wherein the one or more polyamide polymers comprise a PA66 polymer.

Embodiment 9

An embodiment of any of the embodiments of embodiment 1-8, wherein the one or more polyamide polymers comprise a PA6 polymer.

Embodiment 10

An embodiment of any of the embodiments of embodiment 1-9, wherein the one or more polyamide polymers comprise: from 25 wt % to 100 wt % PA66 polymer; and from 0 wt % to 75 wt % PA6 polymer.

Embodiment 11

An embodiment of any of the embodiments of embodiment 1-10, wherein the number average molecular weight of each of the one or more polyamide polymers is independently less than 100,000.

Embodiment 12

An embodiment of any of the embodiments of embodiment 1-11, wherein each of the one or more polyamide polymers is crystalline or semi-crystalline.

Embodiment 13

An embodiment of any of the embodiments of embodiment 1-12, wherein the impact modifier comprises an ethylene-octene copolymer.

Embodiment 14

An embodiment of any of the embodiments of embodiment 1-13, comprising: from 13 wt % to 68 wt % of a PA66 polyamide polymer; from 25 wt % to 40 wt % glass fiber; and from 6 wt % to 20 wt % of the impact modifier; wherein the polyamide composition has a notched Charpy impact energy loss at 23° C. greater than 6 kJ/m².

Embodiment 15

An embodiment of any of the embodiments of embodiment 1-14, comprising: from 13 wt % to 68 wt % of a PA66 polyamide polymer; from 25 wt % to 40 wt % glass fiber; and from 6 wt % to 20 wt % of the impact modifier; wherein the polyamide composition has a tensile modulus greater than 2500 MPa.

Embodiment 16

An embodiment of any of the embodiments of embodiment 1-15, further comprising: nigrosine at a concentration less than 5 wt %.

Embodiment 17

An embodiment of embodiment 16, wherein the weight ratio of the one or more polyamide polymers to the nigrosine ranges from 1 to 85.

Embodiment 18

An embodiment of embodiment 16 or 17, wherein the weight ratio of glass fiber to the nigrosine ranges from 2 to 60.

Embodiment 19

An embodiment of any of the embodiments of embodiment 15-17, wherein the weight ratio of the impact modifier to the nigrosine ranges from 0.5 to 30.

Embodiment 20

An embodiment of any of the embodiments of embodiment 16-19, wherein the weight ratio of the heat stabilizer to the nigrosine ranges from 0.02 to 5.

Embodiment 21

An embodiment of any of the embodiments of embodiment 1-20, further comprising: carbon black at a concentration less than 5 wt %.

Embodiment 22

An embodiment of any of the embodiments of embodiment 1-21, further comprising: a melt stabilizer at a concentration less than 5 wt %.

Embodiment 23

An embodiment of embodiment 22, wherein the melt stabilizer does not comprise an ionic melt stabilizer.

Embodiment 24

An embodiment of embodiment 22 or 23, wherein the melt stabilizer comprises a saturated fatty acid.

Embodiment 25

An embodiment of any of the embodiments of embodiment 1-24, comprising: from 13 wt % to 68 wt % PA66 polyamide polymer; from 25 wt % to 40 wt % glass fiber; from 6 wt % to 20 wt % impact modifier; from 1 wt % to 2 wt % nigrosine; from 0.1 wt % to 1 wt % heat stabilizer; less than 20 wt % PA6 polyamide polymer; less than 3 wt % carbon black; and less than 1 wt % melt stabilizer.

Embodiment 26

An embodiment of any of the embodiments of embodiment 1-25, comprising: from 30 wt % to 60 wt % PA66 polyamide polymer; from 30 wt % to 35 wt % glass fiber; from 10 wt % to 15 wt % impact modifier; from 1.2 wt % to 1.8 wt % nigrosine; from 0.2 wt % to 1.8 wt % carbon black; from 0.2 wt % to 0.7 wt % melt stabilizer; and from 0.2 wt % to 0.7 wt % heat stabilizer; wherein the polyamide composition is substantially free of PA6 polyamide polymer.

Embodiment 27

A method of preparing a polyamide composition, the method comprising: providing one or more polyamide polymers, glass fiber, an impact modifier, and optionally, a heat stabilizer; and combining the one or more polyamide polymers, the glass fiber, the impact modifier, and the heat stabilizer to produce the polyamide composition.

Embodiment 28

An embodiment of embodiment 27, further comprising: providing nigrosine, wherein the combining comprises adding the nigrosine to the polyamide composition.

Embodiment 29

An embodiment of embodiment 27 or 28, further comprising: providing carbon black, wherein the combining comprises adding the carbon black to the polyamide composition.

Embodiment 30

An embodiment of any of the embodiments of embodiment 27-29, further comprising: providing a melt stabilizer, wherein the combining comprises adding the melt stabilizer to the polyamide composition.

Embodiment 31

An embodiment of any of the embodiments of embodiment 27-30, wherein the polyamide composition comprises from 13 wt % to 68 wt % PA66 polyamide polymer; from 25 wt % to 40 wt % glass fiber; from 6 wt % to 20 wt % impact modifier; from 1 wt % to 2 wt % nigrosine; from 0.1 wt % to 1 wt % heat stabilizer; less than 20 wt % PA6 polyamide polymer; less than 3 wt % carbon black; and less than 1 wt % melt stabilizer.

Embodiment 32

An injection molded article comprising the polyamide composition of any of the embodiments of embodiment 1-26.

Embodiment 33

An impact-modified polyamide composition comprising: from 5 wt % to 85 wt % of polyamide polymer; from 10 wt % to 60 wt % glass fiber; from 3 wt % to 30 wt % of an impact modifier; and a melt stabilizer at a concentration less than 5 wt %; wherein the weight ratio of the impact modifier to the melt stabilizer ranges from 1.0:1 to 100:1; and wherein the polyamide composition demonstrates an unnotched Charpy impact energy loss at 23° C. that is greater than 80 kJ/m$^2$ and a tensile strength greater than 135 MPa.

Embodiment 34

An embodiment of any of the embodiments of embodiment 1-25 and 33, wherein the weight ratio of the one or more polyamide polymers to the glass fiber ranges from 0.1 to 10.

Embodiment 35

An embodiment of any of the embodiments of embodiment 1-25, 33, and 34, wherein the weight ratio of the one or more polyamide polymers to the impact modifier ranges from 0.2 to 30.

Embodiment 36

An embodiment of any of the embodiments of embodiment 1-25, and 33-35, wherein the weight ratio of the one or more polyamide polymers to the heat stabilizer ranges from 1 to 850.

Embodiment 37

An embodiment of any of the embodiments of embodiment 1-25, and 33-36, wherein the weight ratio of the polyamide polymer to the glass fiber ranges from 0.1 to 10.

Embodiment 38

An embodiment of any of the embodiments of embodiment 1-25, and 33-37, wherein the weight ratio of the polyamide polymer to the impact modifier ranges from 0.2 to 30.

Embodiment 39

An embodiment of any of the embodiments of embodiment 1-25, and 33-85, wherein the weight ratio of the impact modifier to the melt stabilizer ranges from 1:1 to 40:1.

Embodiment 40

An embodiment of any of the embodiments of embodiment 1-25, and 33-39, wherein the polyamide composition demonstrates a 60° tan delta greater than 0.04.

Embodiment 41

An embodiment of any of the embodiments of embodiment 1-25, and 33-40, wherein the polyamide composition demonstrates a 90° tan delta greater than 0.1.

Embodiment 42

An embodiment of any of the embodiments of embodiment 1-25, and 33-41, wherein the impact modifier comprises a modified olefin.

Embodiment 43

An embodiment of any of the embodiments of embodiment 1-25, and 33-42, wherein the impact modifier comprises a maleic anhydride-modified olefin, acrylate, or acrylic, or combinations thereof.

Embodiment 44

An embodiment of any of the embodiments of embodiment 1-25, and 33-43, wherein the impact modifier comprises a maleic anhydride-modified olefin.

Embodiment 45

An embodiment of any of the embodiments of embodiment 1-25, and 33-44, wherein the impact modifier has a glass transition temperature less than 0° C.

Embodiment 46

An embodiment of any of the embodiments of embodiment 1-25, and 33-45, wherein the melt stabilizer comprises a saturated fatty acid.

Embodiment 47

An embodiment of any of the embodiments of embodiment 1-25, and 33-46, wherein the melt stabilizer comprises stearic acid.

Embodiment 48

An embodiment of any of the embodiments of embodiment 1-25, and 33-47, wherein the weight ratio of the glass fiber to the impact modifier ranges from 0.3 to 20.

Embodiment 49

An embodiment of any of the embodiments of embodiment 1-25, and 33-48, wherein the weight ratio of the impact modifier to the heat stabilizer ranges from 0.5 to 300.

Embodiment 50

An embodiment of any of the embodiments of embodiment 1-25, and 33-49, wherein the impact modifier comprises a maleic anhydride-modified olefin, acrylate, or acrylic, or combinations thereof; and the weight ratio of the impact modifier to the melt stabilizer ranges from 5 to 50; and the melt stabilizer comprises a saturated fatty acid wherein the polyamide composition; and wherein the polyzmide composition demonstrates a tensile elongation greater than 2.5%; and an un-notched Charpy impact energy loss at −40° C. that is greater than 65 kJ/m$^2$

Embodiment 51

An embodiment of any of the embodiments of embodiment 1-25, and 33-50, wherein the polyamide polymer comprises a PA66 polymer.

Embodiment 52

An embodiment of any of the embodiments of embodiment 1-25, and 33-51, wherein the number average molecular weight of each of the polyamide polymers is independently less than 100,000.

Embodiment 53

An embodiment of any of the embodiments of embodiment 1-25, and 33-52, comprising from 13 wt % to 68 wt % of a PA66 polyamide polymer; from 25 wt % to 40 wt % glass fiber; wherein the polyamide composition has a notched Charpy impact energy loss at 23° C. greater than 11 kJ/m$^2$.

Embodiment 54

An embodiment of any of the embodiments of embodiment 1-25, and 33-53, comprising: from 13 wt % to 68 wt % PA66 polyamide polymer; from 25 wt % to 40 wt % glass fiber; impact modifier; from 1 wt % to 2 wt % nigrosine; from 0.1 wt % to 1 wt % heat stabilizer; less than 20 wt % PA6 polyamide polymer; less than 3 wt % carbon black; and less than 1 wt % melt stabilizer.

Embodiment 55

An injection molded article comprising the polyamide composition of any of the aforementioned embodiments.

Embodiment 56

An embodiment of any of the embodiments of embodiment 1-25, and 33-54, wherein the impact-modified polyamide composition comprises from 45 wt % to 60 wt % polyamide polymer comprising PA-6 and/or PA-6,6; from 20 wt % to 50 wt % glass fiber; from 2 wt % to 25 wt % impact modifier; from 0.1 wt % to 3 wt % melt stabilizer (weight ratio of the impact modifier to the melt stabilizer ranging from 10 to 40), wherein the composition demonstrates an un-notched Charpy impact energy loss at 23° C. that is greater than 80 kJ/m$^2$; an un-notched Charpy impact energy loss at −40° C. that is greater than 70 kJ/m$^2$; a notched Charpy impact energy loss at 23° C. that is greater than 11 kJ/m$^2$; a notched Charpy impact energy loss at −40° C. that is greater than 10 kJ/m$^2$; a tensile strength greater than 135 MPa, and a tan delta (at 90° C.) that is greater than 0.175 au.

Embodiment 57

An embodiment of any of the embodiments of embodiment 1-25, and 33-54, wherein the impact-modified polyamide composition comprises from 51 wt % to 57 wt % polyamide polymer comprising PA-6 and/or PA-6,6; 4.0 wt % to 15 wt % impact modifier comprising a maleic anhydride-modified olefin, acrylate, or acrylic, or combinations thereof; from 0.1 wt % to 3 wt % melt stabilizer comprising a saturated fatty acid (weight ratio of the impact modifier to the melt stabilizer ranging from 10 to 35), wherein the composition demonstrates an un-notched Charpy impact energy loss at 23° C. that is greater than 83 kJ/m$^2$; an un-notched Charpy impact energy loss at −40° C. that is greater than 73 kJ/m$^2$; a tensile strength greater than 145 MPa, and a tan delta (at 90° C.) that is greater than 0.19 au.

Embodiment 58

An embodiment of any of the embodiments of embodiment 1-25, and 33-54, wherein the impact-modified polyamide composition comprises from 51 wt % to 57 wt % polyamide polymer comprising PA-6 and/or PA-6,6; 4.0 wt % to 15 wt % impact modifier comprising maleic anhydride-modified ethylene octene and/or ethylene acrylate, from 0.1 wt % to 3 wt % melt stabilizer comprising stearic acid, or behenic acid, or combinations thereof, or salts thereof (weight ratio of the impact modifier to the melt stabilizer ranging from 10 to 35), wherein the composition demonstrates an un-notched Charpy impact energy loss at 23° C. that is greater than 83 kJ/m$^2$; an un-notched Charpy impact energy loss at −40° C. that is greater than 73 kJ/m$^2$; a notched Charpy impact energy loss at 23° C. that is greater than 11 kJ/m$^2$; a notched Charpy impact energy loss at −40° C. that is greater than 10 kJ/m$^2$; a tensile strength greater than 145 MPa, and a tan delta (at 90° C.) that is greater than 0.21 au.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. An impact-modified polyamide composition comprising:
   from 13 wt % to 68 wt % PA66 polyamide polymer;
   reinforcing filler consisting of from 25 wt % to 40 wt % glass fiber;
   from 11.1 wt % to 27.3 wt % of a maleic anhydride modified impact modifier an impact modifier;
   from 1 wt % to 2 wt % nigrosine;
   from 0.1 wt % to 1 wt % heat stabilizer;
   less than 20 wt % PA6 polyamide polymer;
   less than 3 wt % carbon black; and
   from 0.5 wt % to 1 wt % of a melt stabilizer, wherein the melt stabilizer is stearic acid;
   wherein the weight ratio of the maleic anhydride modified impact modifier to the melt stabilizer ranges from 12:1 to 35:1; and
   wherein the weight ratio of the PA66 polyamide polymer to the maleic anhydride modified impact modifier is less than 12; and
   wherein the polyamide composition demonstrates an un-notched Charpy impact energy loss at 23° C. that is greater than 80 kJ/m$^2$ and a tensile strength greater than 135 MPa.

2. The polyamide composition of claim 1, wherein the weight ratio of the PA66 polyamide polymer to the glass fiber ranges from 0.1:1 to 10:1.

3. The polyamide composition of claim 1, wherein the polyamide composition demonstrates a tan delta at 60° C., as measured using dynamic mechanical analysis greater than 0.04.

4. The polyamide composition of claim 1, wherein the polyamide composition demonstrates a tan delta at 90° C., as measured using dynamic mechanical analysis greater than 0.1.

5. The polyamide composition of claim 1, wherein the maleic anhydride modified impact modifier comprises a maleic anhydride-modified acrylate.

6. The polyamide composition of claim 1, wherein the maleic anhydride modified impact modifier comprises a maleic anhydride-modified olefin.

7. The polyamide composition of claim 1, wherein the maleic anhydride modified impact modifier has a glass transition temperature less than 0° C.

8. The polyamide composition of claim 1, wherein the weight ratio of the glass fiber to the maleic anhydride modified impact modifier ranges from 0.3:1 to 20:1.

9. The polyamide composition of claim 1, wherein the composition comprises a heat stabilizer and the weight ratio of the maleic anhydride modified impact modifier to the heat stabilizer ranges from 0.5:1 to 300:1.

10. The polyamide composition of claim 1, wherein the polyamide composition demonstrates a tensile elongation greater than 2.5%; and an un-notched Charpy impact energy loss at −40° C. that is greater than 65 kJ/m$^2$.

11. The polyamide composition of claim 1, wherein the number average molecular weight of each of the PA66 polyamide polymers is independently greater than 26,000.

12. The polyamide composition of claim 1, wherein the polyamide composition has a notched Charpy impact energy loss at 23° C. greater than 11 kJ/m$^2$.

13. An injection molded article comprising the polyamide composition of claim 1.

14. The polyamide composition of claim 1, wherein the composition comprises nigrosine and the weight ratio of the maleic anhydride modified impact modifier to the nigrosine is greater than 13.

* * * * *